(12) United States Patent
Nguyen et al.

(10) Patent No.: US 6,763,437 B1
(45) Date of Patent: Jul. 13, 2004

(54) CONTROL SYSTEM, STORAGE DEVICE AND METHOD FOR CONTROLLING ACCESS TO A SHARED MEMORY USING A BUS CONTROL OR HANDSHAKING PROTOCOL

(75) Inventors: Trung Nguyen, San Jose, CA (US);
Hang Nguyen, Fremont, CA (US);
John W. Brooks, San Jose, CA (US);
Parminder K. Gill, Fremont, CA (US)

(73) Assignee: Maxtor Corporation, Longmont, CO (US)

(*) Notice: Subject to any disclaimer, the term of this patent is extended or adjusted under 35 U.S.C. 154(b) by 447 days.

(21) Appl. No.: 09/656,529

(22) Filed: Sep. 7, 2000

(51) Int. Cl.[7] .............................................. G06F 13/36
(52) U.S. Cl. ..................... 711/147; 151/158; 151/112
(58) Field of Search ............................... 711/147, 151, 711/158, 112, 113

(56) References Cited

U.S. PATENT DOCUMENTS

| | | | |
|---|---|---|---|
| 5,261,058 A | * 11/1993 | Squires et al. | 710/1 |
| 5,465,343 A | * 11/1995 | Henson et al. | 711/112 |
| 5,710,911 A | 1/1998 | Walsh et al. | 713/500 |
| 5,713,006 A | 1/1998 | Shigeeda | 711/170 |
| 5,794,054 A | 8/1998 | Le et al. | 710/240 |
| 5,835,733 A | 11/1998 | Walsh et al. | 710/303 |
| 5,875,349 A | 2/1999 | Cornaby et al. | 711/5 |
| 5,884,055 A | 3/1999 | Tung et al. | 710/307 |
| 5,890,218 A | 3/1999 | Ogawa et al. | 711/148 |
| 5,893,158 A | 4/1999 | Furuta | 711/150 |
| 5,894,586 A | 4/1999 | Marks et al. | 710/28 |
| 5,907,862 A | 5/1999 | Smalley | 711/163 |
| 5,918,248 A | 6/1999 | Newell et al. | 711/147 |
| 5,933,855 A | 8/1999 | Rubinstein | 711/200 |
| 5,954,802 A | 9/1999 | Griffith | 710/22 |
| 5,956,288 A | 9/1999 | Bermingham | 365/230.06 |
| 5,963,977 A | 10/1999 | Gold et al. | 711/156 |
| 6,008,823 A | 12/1999 | Rhoden et al. | 345/541 |
| 6,014,729 A | 1/2000 | Lannan et al. | 711/150 |
| 6,178,486 B1 | * 1/2001 | Gill et al. | 711/151 |
| 6,438,629 B1 | * 8/2002 | Huebner et al. | 710/52 |
| 6,530,000 B1 | * 3/2003 | Krantz et al. | 711/151 |
| 2002/0065994 A1 | * 5/2002 | Henson et al. | 711/151 |

* cited by examiner

Primary Examiner—Glenn Gossage

(57) ABSTRACT

A method and system of providing access to a shared memory interconnected to a first controller and a second controller via a bus, the bus having control signals associated therewith for data transfer control and communication between the first and the second controllers. The second controller transmits an access request to the first controller for control of the bus to access the memory. The first controller selectively grants the access request and transmits an acknowledge to the second controller; and upon receiving the acknowledge, the second controller accesses the memory for data transfer. The first controller has a first priority for accessing the memory, and the second controller has a second priority for accessing the memory, the second priority being lower than the first priority such that upon request the first controller selectively grants control of the bus to the second controller for memory access, otherwise the first controller maintains control of the bus for memory access. In one embodiment, the second controller transmits an access request to the first controller for control of the bus to access the memory; and in response, the first controller selectively grants the access request and transmits an acknowledge to the second controller. Each of the controllers relinquishes control of the bus by placing the bus in tristate, wherein the relinquishing controller stops driving the bus.

68 Claims, 15 Drawing Sheets

CONTROL SYSTEM, STORAGE DEVICE AND METHOD FOR CONTROLLING ACCESS TO A SHARED MEMORY USING A BUS CONTROL OR HANDSHAKING PROTOCOL

FIELD OF THE INVENTION

The present invention relates to access to a memory device by at least two controllers, and more particularly to a bus control protocol for providing memory access to the controllers.

BACKGROUND OF THE INVENTION

Storage devices such as disk drives are used in various systems such as computer systems and audio/visual systems (e.g., Digital VCR (DVCR)) for data storage. A typical disk drive comprises a head structure including one or more read/write heads moved by a support arm of an actuator assembly via a voice coil motor across tracks of one or more disks for data storage and data retrieval. The disk drive further includes drive electronics comprising a preamplifier/write driver circuit connected to the actuator assembly so that electrical signals may reach the heads. The signals leaving and entering the drive electronics are utilized by a drive microcontroller and other electronics including a motors control Application Specific Integrated Circuit (ASIC) which supplies driving signals to operate a spindle motor and the actuator, a Partial Response Maximum Likelihood (PRML) read/write channel ASIC which receives and decodes coded data from the disk and which encodes and delivers coded data to the write driver portion of the channel.

The disk drive further includes a disk drive controller ASIC implementing a SERbES/ENDEC function, an Error Correction Code (ECC) function, a data sequencer, a memory controller, a bus level interface, and a microprocessor interface for interfacing a microprocessor with other circuits including a Dynamic Random-Access Memory (DRAM) buffer which contains microprocessor program instructions as well as data blocks being transferred between a host and the data storage disk. An internal data,.address, control bus structure interconnects the microprocessor, motors control ASIC, PRML read/write channel ASIC, the disk drive controller ASIC and the DRAM buffer chip. A connection from the disk drive controller ASIC to host computing equipment is provided by a drive interface bus.

However, a disadvantage of such a disk drive is that the disk drive controller ASIC handles all DRAM buffer access protocol, such that all data transfer between the DRAM buffer and the disks, and data transfer between the DRAM buffer and the host is handled by the disk drive controller ASIC. Therefore, all features required for supporting host data transfer for different hosts (e.g., DRAM buffer access requirements for data transfer between the host and the DRAM buffer) must be included in the disk drive controller ASIC. For example, the disk drive controller ASIC must support differing host transfer features for both Audio/Video (A/V) products and for computer systems. As such, the disk drive cannot be used in conjunction with a new host system unless the disk drive controller ASIC is modified to include host data transfer features required for the host system. A new disk drive controller ASIC is required everytime the disk drive is used in a new host system with new features not included in the disk drive controller ASIC. This increases the disk drive controller ASIC redesign cycles, increasing costs.

There is, therefore, a need for a control system and access protocol for controlling access to a shared memory that alleviates the above problems. There is also a need for such a control system for a disk drive such that data transfer between the disks and a shared buffer memory in the disk drive is decoupled from the host system data transfer between the host system and the disk drive memory buffer. There is also a need for a buffer access protocol for providing buffer memory access for data transfer between the disks and the buffer memory and for data transfer between the host system and the buffer memory. There is also a need for such a disk drive to be usable with different host systems having different data transfer requirements.

BRIEF SUMMARY OF THE INVENTION

The present invention satisfies these needs. In one embodiment, the present invention provides a method and control system of providing access to a memory interconnected to a first controller and a second controller via a bus, the bus for transferring data between the first controller and the memory, and between the second controller and the memory, the bus having control signals associated therewith for data transfer control and communication between the first and the second controllers. The second controller transmits an access request to the first controller for bus control to access the memory; and in response, the first controller selectively grants the access request and transmits an acknowledge to the second controller. Upon receiving the acknowledge, the second controller accesses the memory for data transfer.

In one version, the first controller can have a higher priority for accessing the memory and the second controller, such that upon an access request the first controller selectively grants bus control to the second controller for, memory access, otherwise the first controller maintains bus control for memory access. However, upon access request from the first controller, the second controller relinquishes bus control unconditionally. In one embodiment, each of the controllers relinquishes control of the bus by placing the bus in "tristate", wherein the relinquishing controller stops driving the bus.

Such a memory access control method and system according to the present invention can be utilized in any application where controlling access to a shared memory by two or more controllers is required. For example, according to one aspect of the present invention, data transfer between the disks and a shared buffer memory in the disk drive is decoupled from a host system data transfer between the host system and the memory buffer. As such, a bus is connected to the memory, wherein a storage controller (first controller) connected to the bus handles data transfer between the disks and a shared buffer memory via the bus, and a host interface (second controller) connected to the bus handles data transfer between the host system and the memory buffer via the bus. The storage controller and the host interface communicate therebetween for handshaking to access the memory via the bus without contention.

BRIEF DESCRIPTION OF THE DRAWINGS

These and other features, aspects and advantages of the present invention will become better understood with regard to the following description, appended claims and accompanying drawings where:

Like reference numbers and designations in the drawings refer to like elements.

DETAILED DESCRIPTION OF THE INVENTION

Figure 1:
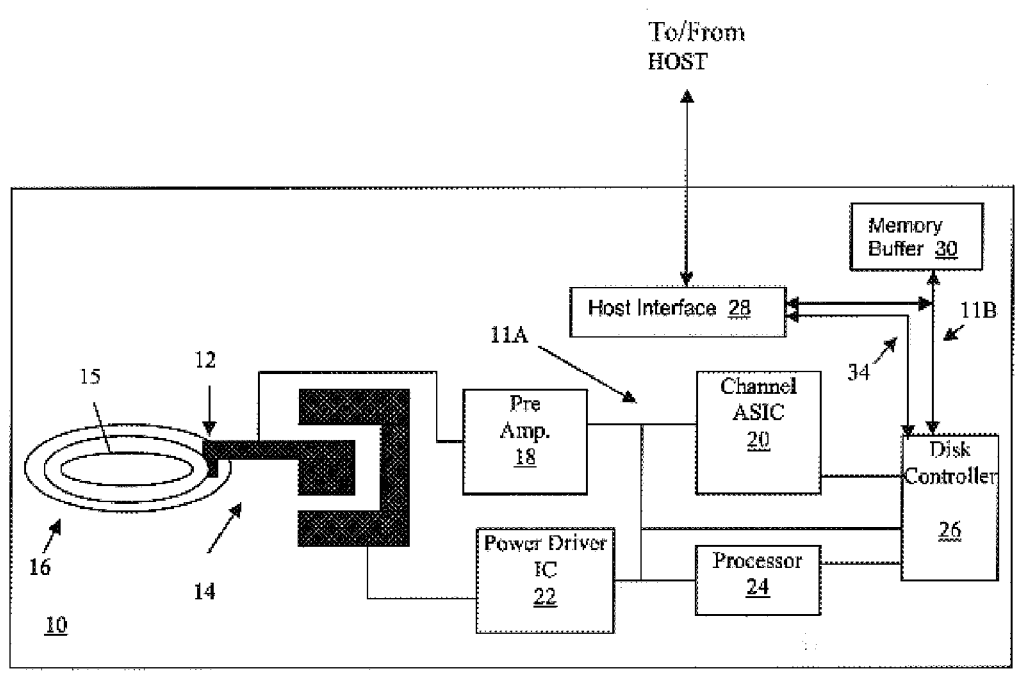
FIG. 1 shows as an exemplary block diagram of an embodiment of a disk drive in which the present invention is implemented.

FIG. 1 shows as an exemplary block diagram of an embodiment of a disk drive 10 in which a version of the present invention is implemented. The disk drive 10 comprises a head structure 12 including one or more magneto-resistive (MR) heads moved by a support arm of an actuator assembly 14 via a Voice Coil Motor (VCM) across tracks of one or more disks 16 for data storage data retrieval. The disk drive 10 further includes a preamplifier 18 for amplifying the read and write signals from and to the disks 16, respectively, and a channel ASIC 20 which receives and decodes coded data from the disk 16 and which encodes and delivers coded data to the write driver portion of the channel. The disk drive 10 further includes a power driver IC 22 for driving the actuator 14 and a spindle motor for rotating the disks 16 having circular tracks 15 thereon.

The disk drive further includes a disk drive controller 26 (disk controller) implementing a SERDES/ENDEC function, an ECC function, a data sequencer, a memory/buffer controller, a bus level interface, and a microprocessor interface for interfacing a microprocessor (processor) 24 with other circuits including a memory/buffer (e.g., DRAM) 30 which contains microprocessor program instructions as well as data blocks being transferred between a host and the data storage disk. An internal data, address, control bus structure 11A interconnects the microprocessor 24, the driver IC 22, the read/write channel ASIC 20, and the disk drive controller 26. Another internal bus structure 11B interconnects the controller 26, a host interface 28 and the buffer memory chip 30. The host interface 28 provides a connection from the disk drive 10 to host computing equipment via an interface bus. This is in contrast with the aforementioned conventional disk drives where the host interface 28 is absent, and a connection from the disk drive to a host is provided only by a disk drive controller such that all data transfer between the buffer memory 30 and the disks 16, and data transfer between the buffer memory 30 and the host, is handled by the disk drive controller.

Regarding nomenclature used in this specification, data is used generally in this specification to refer to information suitable for communication, interpretation, or processing within a computer system. Nevertheless, data may refer to different types of information according to the context in which it is used. For example, in the context of a data transfer device, data generally refers to information that may be read from or written to the data medium. On the other hand, data on a bus may include such data that may be written to or read from the data transfer device and may also include control information.

According to a version of the present invention, the disk drive controller 26 (first controller) handles data transfer between the buffer memory 30 and the disks, and the host interface 28 (second controller) handles data transfer between the buffer memory 30 and the host, via the bus 11B. The controller 26 and the host interface 28 utilize a buffer access protocol to manage access to the buffer memory 30 via the bus 11B. Exclusive access to the buffer memory 30 via the bus 11B is transferred back and forth between the controller 26 and the host interface 28 by handshaking via request (HREQ) and acknowledgment (HACK) signals through the bus 11B. When the host interface 28 needs to transfer data to/from the buffer memory 30, the host interface 28 sends (asserts) a HREQ signal to the controller 26. When the controller 26 is ready to transfer control of the bus 11B to the host interface 28, the controller 26 sends (asserts) a HACK signal to the host interface 28. Upon receiving the HACK signal, the host interface 28 can begin data transfer to/from the buffer memory 30.

Thereafter, the host interface 28 can voluntarily relinquish control of the buffer memory 30, or can be pre-emptied by the controller 26. In the first case, when the host interface 28 has completed data transfer to/from the buffer memory 30, the host interface de-asserts the HREQ signal, whereupon the controller 26 de-asserts the HACK signal and regains access to the buffer memory 30. In the second case, the controller 26 pre-empts the host interface 28 for access to the buffer memory 30 by deasserting the HACK signal, whereby in response thereto the host interface 28 deasserts the HREQ signal, and upon detecting deassertion of the HREQ signal, the controller 26 regains access to the buffer memory 30.

Figure 2:
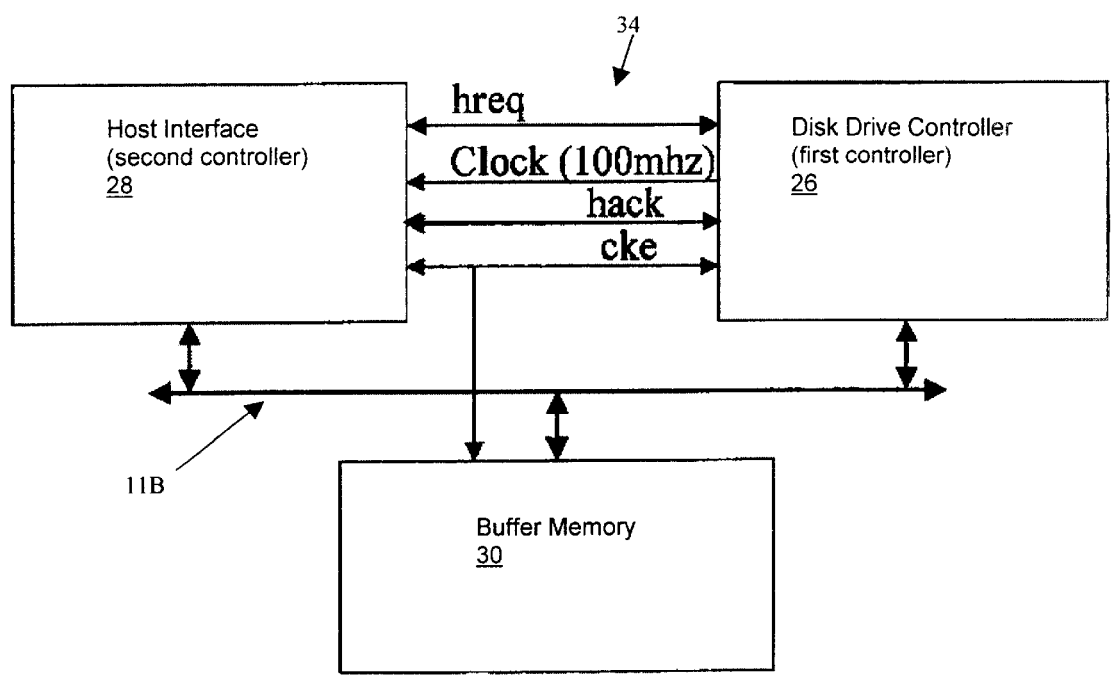
FIG. 2 shows an exemplary block diagram of an embodiment of the interconnection architecture for the disk drive controller, the host interface, and the buffer memory of the disk drive of FIG. 1.

FIG. 2 shows an exemplary block diagram of an embodiment of the interconnection architecture for the disk drive controller 26 (first controller), the host interface 28 (second controller) and the buffer memory 30 (shared memory), via the bus 11B. The bus 11B includes address, data and memory control lines for accessing the buffer memory 30. The disk drive controller 26 (or simply "controller 26") and the host interface 28 utilize communication lines 34 therebetween for communication and handshaking. The communication lines 34 can comprise electrical connections, bus, hard wired lines, printed circuit board electrical S connections, electrical connections in an ASIC, etc. In one embodiment, the lines 34 include a request line (HREQ), an acknowledge line (HACK), and a bus relinquish line (CKE or STOPCLKN) indicating that the bus is not driven by either the controller 26 or the host interface 28, for handshaking between the controller 26 and the host interface 28.

Figure 3:
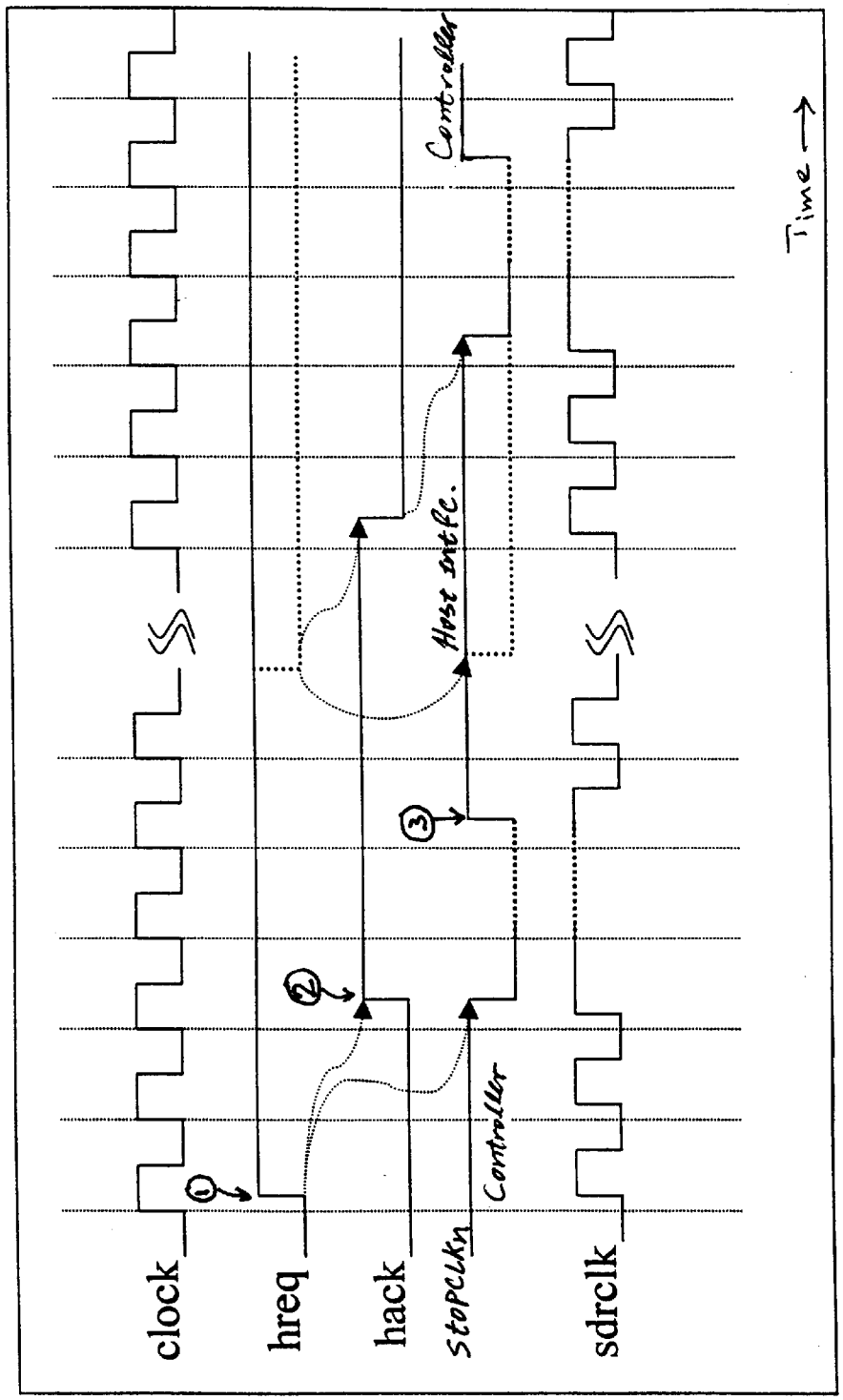
FIG. 3 shown an exemplary timing diagram of an embodiment of a buffer access protocol according to the present invention.

FIG. 3 shows an exemplary timing diagram of a version of buffer access protocol according to the present invention. In this version, the controller 26 has higher priority than the host interface 28, and as such, generally the controller 26 has control of the bus 11B for accessing the buffer memory 30. The ownership/control of the bus 11B including memory control signals/lines is transferred back and forth between the controller 26 and the host interface 28 by handshaking via the HREQ and HACK signals. When the host interface 28 needs to transfer data to/from the buffer memory 30, the host interface 28 sends (asserts) a HREQ signal to the controller 26 at 1̂. Upon receiving/detecting the HREQ signal, when the controller 26 is ready to transfer control of the bus 11B to the host interface 28, the controller 26 stops driving the bus 11B (e.g., relinquishes bus control, deasserts CKE or STOPCLKN, and stops driving at least the memory control lines in bus 11B) and sends (asserts) a HACK signal to the host interface 28 at 2̂. Upon receiving/detecting the HACK signal, the host interface 28 can begin data transfer to/from the buffer memory via the bus 11B at 3̂. The 'clock' signal is a free running signal for synchronizing the host interface 28 and the controller 26. As described further below, in one version, the CKE and HACK signals are used together by each of the host interface 28 and the controller 26 to communicate with one another when the bus 11B is relinquished to prevent contention.

As used herein, when either of the host interface 28 or the controller 26 relinquishes control of the bus 11B and stops driving the bus 11B, it is referred to as the host interface 28 or the controller 26 placing the bus 11B in 'tristate'. In one example implementation, tristate can be a state of logic signal where one or more signals/lines in bus 11B are not driven to either of the known logic states (e.g., high/low, active/inactive, assert/deassert, 0/1, etc.), and goes to an intermediate voltage which is of high impedance. In this description e.g. 'low' refers to logical state signal level 0, and 'high' refers to logical state signal level 1.

In one version, there are two scenarios in which the host interface 28 relinquishes control of the bus 11B to the controller 26. In a first scenario, when the host interface 28 has completed data transfer to/from the buffer memory 30, the host interface 28 voluntarily relinquishes bus control by tristating the bus (e.g., the memory control signals) and de-asserts the HREQ signal, whereupon the controller 26 de-asserts the HACK signal and regains control of the bus 11B and the memory control signals again. In a second scenario, the controller 26 desires to take bus control away from the host interface 28 for memory access, wherein the controller 26 deasserts the HACK signal and in response thereto the host interface 28 relinquishes bus control by tristating all the memory control signals, and deasserts the HREQ signal such that the controller 26 regains control of the bus 11B and can drive the memory control signals to access the buffer memory 30.

In one example, the HREQ signal comprises a request from the host interface 28 to the controller 26 to access the buffer memory 30, and remains asserted/active (e.g., active or asserted high) so long as the host interface 28 has data to transfer from/to the buffer memory 30. The HACK signal comprises the acknowledge signal (e.g., active or asserted high) from the controller 26 to the host interface 28 to allow the host interface 28 to control the bus 11B to access the buffer memory 30 for data transfer.

In one version, the HACK signal can be used in conjunction with the bus relinquish signal (STOPCLKN/CKE) for the host interface 28 to determine when it is allowed by the controller 26 to control the bus 11B to access the buffer memory 30. The STOPCLKN signal (stpclkn) comprises a bidirectional signal (active or asserted when low), used as an input when the host interface 28 requests control of the bus 11B. Whereby, after asserting the HREQ signal, the host interface 28 waits for both the HACK and STOPCLKN signals to be asserted before controlling the bus 11B to access the buffer memory 30. The STOPCLKN signal is used when the controller 26 needs to regain control of the buffer memory 30. The controller 26 deasserts the HACK signal and then waits for the host interface 28 to deassert the STOPCLKN signal before the controller 26 can control the bus 11B to access the buffer memory 30. When the STOPCLKN signal is deasserted, the ownership of the bus 11B is transferred between the host interface 28 and the controller 26, and the host interface 28 relinquishes bus 11B (e.g., by tristating all memory address, data and control lines of the bus 11B) so that the bus 11B can be driven by the controller 26. Table 1 below describes example cases of HACK and STOPCLKN signal combinations for this version of the present invention.

TABLE 1

| HACK | STOPCLKN | description |
| --- | --- | --- |
| 0 | x | The controller 26 is accessing the buffer memory 30, the host interface 28 waits for bus control. The controller 26 wants to regain access to the buffer memory 30, the host interface 28 relinquishes control of the bus 11B as soon as possible. |
| 1 | 0 | The host interface 28 can control the bus 11B. |
| 1 | 1 | The controller 26 gives permission to the host interface 28 to access the buffer memory 30, but the host interface 28 must wait for the STOPCLKN signal to be asserted before controlling the bus 11B. |

In Table 1, 'x' represents a 'do not care' or 'don't care' state, such that when HACK=0, the value of STOPCLKN is not important.

Figure 4:
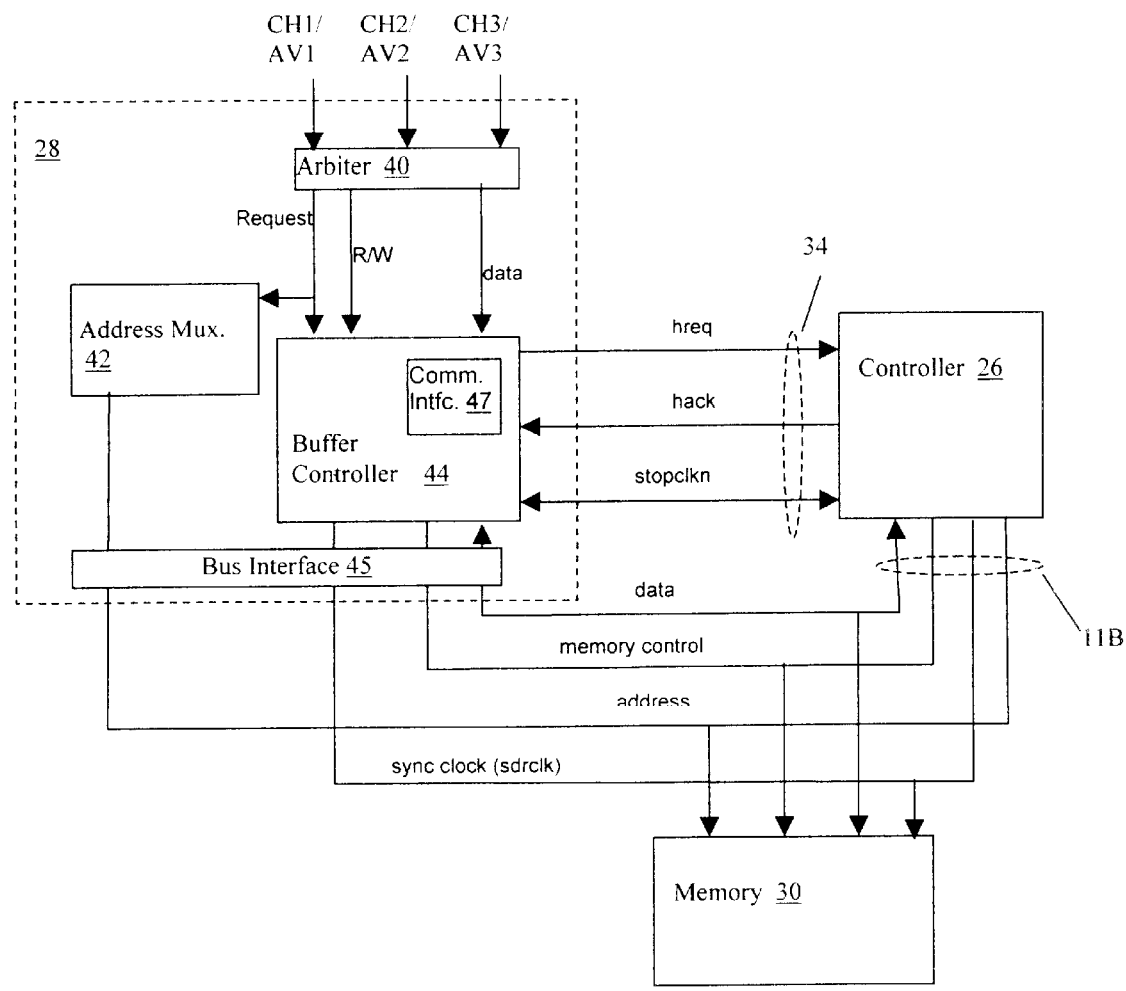
FIG. 4 shows an exemplary block diagram of the architecture of an embodiment of the host interface of FIG. 2 and controller connected to a shared memory.

FIG. 4 shows an exemplary block diagram of the architecture of an embodiment of the host interface 28 and the controller 26, interconnected to the memory 30 via the bus 11B including the 'data', 'address', and 'memory control' lines/signals. In a version where the buffer memory 30 comprises a Synchronous (sync) DRAM (SDRAM), the bus 11B further includes an 'sdrclk' signal, driven to the memory buffer 30 for synchronization by either the host interface 28 or the controller 26 when in control of bus 11B. The host interface 28 communicates with the controller 26 via the communication lines 34 including the 'HREQ', 'HACK' and 'STOPCLKN' lines/signals. The host interface 28 includes an arbiter 40, an address muliplexer (Mux) 42 and a buffer controller 44. The arbiter 40 determines which host input (e.g., audio/visual stream AV1, audio/visual stream AV2, audio/visual stream AV2, and associated host channels CH1, CH2, CH3, respectively) is to transfer data to/from the buffer memory 30 at a time (e.g., first come first serve).

The address MUX 42 is used to select the memory address in the buffer 30 via the bus 11B, for a data stream that the arbiter grants a memory access request, and keeps track of the buffer memory address for each of the AV streams. In the example shown, three different data streams are served, wherein each stream has an associated memory address to transfer data to/from the memory 30. Depending on which stream the arbiter 40 selects to transfer data to/from the memory 30, the MUX 42 selects the associated memory address for the stream in the memory 30.

Figure 5:
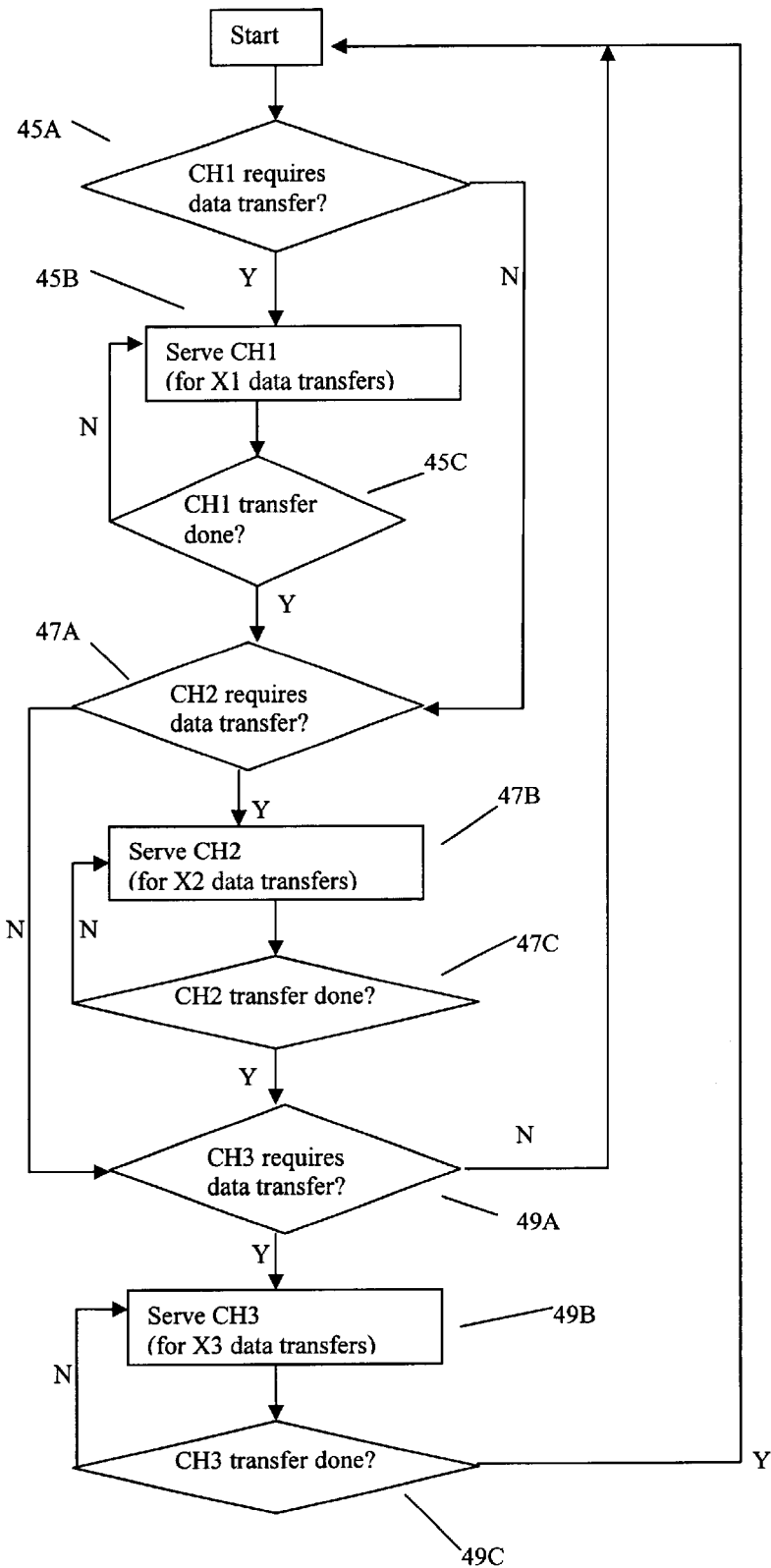
FIG. 5 shows an exemplary flow diagram of the embodiment of the steps performed by host interface of FIG. 4 in granting a buffer access request for different host data streams.

FIG. 5 shows an exemplary flow diagram of an embodiment of the steps performed by an exemplary implementation of the arbiter 40 of the host interface 28 in FIG. 4, in selecting one of the three different host channels CH1, CH2 and CH3 and associated data transfer streams AV1, AV2 and AV3 to or from the buffer 30, respectively. Each channel (CH1, CH2, CH3) raises a request if it needs to transfer data to or from the buffer 30. The arbiter 40 includes a state machine that examines CH1 to determine if CH1 requires to transfer data to/from the buffer 30 (step 45A), and if so the arbiter 40 selects and serves CH1 for data transfer to/from the buffer 30 (step 45B), until CH1 access is complete (step 45C). If in step 45A, CH1 does not require data transfer to/from to the buffer 30, the arbiter 40 proceeds to determine if CH2 requires data transfer to/from the buffer 30 (step 47A). If so the arbiter 40 selects and serves CH2 for data transfer to/from the buffer 30 (step 47B), until the CH2 access is complete (step 47C). If in step 47A, CH2 does not require data transfer to/from the buffer 30, the arbiter 40 proceeds to determine if CH3 requires data transfer to/from the buffer 30 (step 49A). If so, the arbiter 40 selects and serves CH3 for data transfer to/from the buffer 30 (step 49B), until CH3 access is complete (step 49C), and the process is repeated.

Optionally, each channel includes a programmable access register (e.g., X1, X2, X3) to program the number/length of buffer access allowed for each channel at a time. In one example, CH1 is programmed with X1=32, CH2 is programmed with X2=64, and CH3 is programmed with X3=128. If all three channels request to transfer data/to from the buffer 30 at once, the arbiter 40 first serves CH1 for 32 buffer transfers/accesses, then serves CH2 for 64 buffer transfers/accesses, and then serves CH3 for 128 buffer transfer/accesses. Thereafter, the arbiter 40 repeats the process to determine if CH1 requires more data transfer, and so on. The type of arbitration is called modified "round robin" arbitration (as opposed to "priority" arbitration). In one example the controller 26 programs one or more of the X1, X2 and X3 registers, however, other means of programming the registers are possible depending on desired design and performance criteria (e.g., the host interface 28 can program the registers). As each channel gets its own turn to transfer data to/from the buffer 30, by programming the register X1, X2 and X3, in one example, the controller 26 can decide to give a channel a longer period of accessing the buffer 30 by programming a larger value in the channels register. Though three channels have been utilized in this example, less or more channels can be served by the arbiter 40 of the host interface 28. Further, other arbitration schemes are possible (e.g., first come first serve).

Referring back to FIG. 4, the buffer controller 44 provides handshaking with the controller 26 and controls the bus 11B to access the buffer memory 30. The buffer controller 44 receives signals from the arbiter 40, including an 'RIW' signal for data read/write to the buffer memory 30, a 'request' signal indicating a data transfer request by one of the AV streams (causing the buffer controller 44 to assert HREQ), and a 'data' signal representing data from one of the AV streams selected by the arbiter 40 for data transfer to/from the memory 30. In one version, the host interface 28 includes a bus interface 45 for the buffer controller 44 to control the bus 11B for communicating with the memory 30 over the bus 11B. The host interface 28 can further include a communication interface 47 for the buffer controller 44 to communicate with the controller 26 via the communication lines 34.

The HREQ signal informs the controller 26 that the host interface 28 requires control of the bus 11B to access the buffer memory 30. The controller 26 selectively grants the access and sends an acknowledgement to the host interface 28 by asserting the HACK signal. The HACK signal comprises an acknowledgment from the controller 26 to the host interface 28 indicating that control of the bus 11B has been transferred to the host interface 28. In one example, in response to a request by the controller 26 to regain control of the bus, the host interface 28 deasserts the STOPCLKN signal indicating to the controller 26 that the host interface 28 has relinquished control of the bus 11B.

Figure 6:
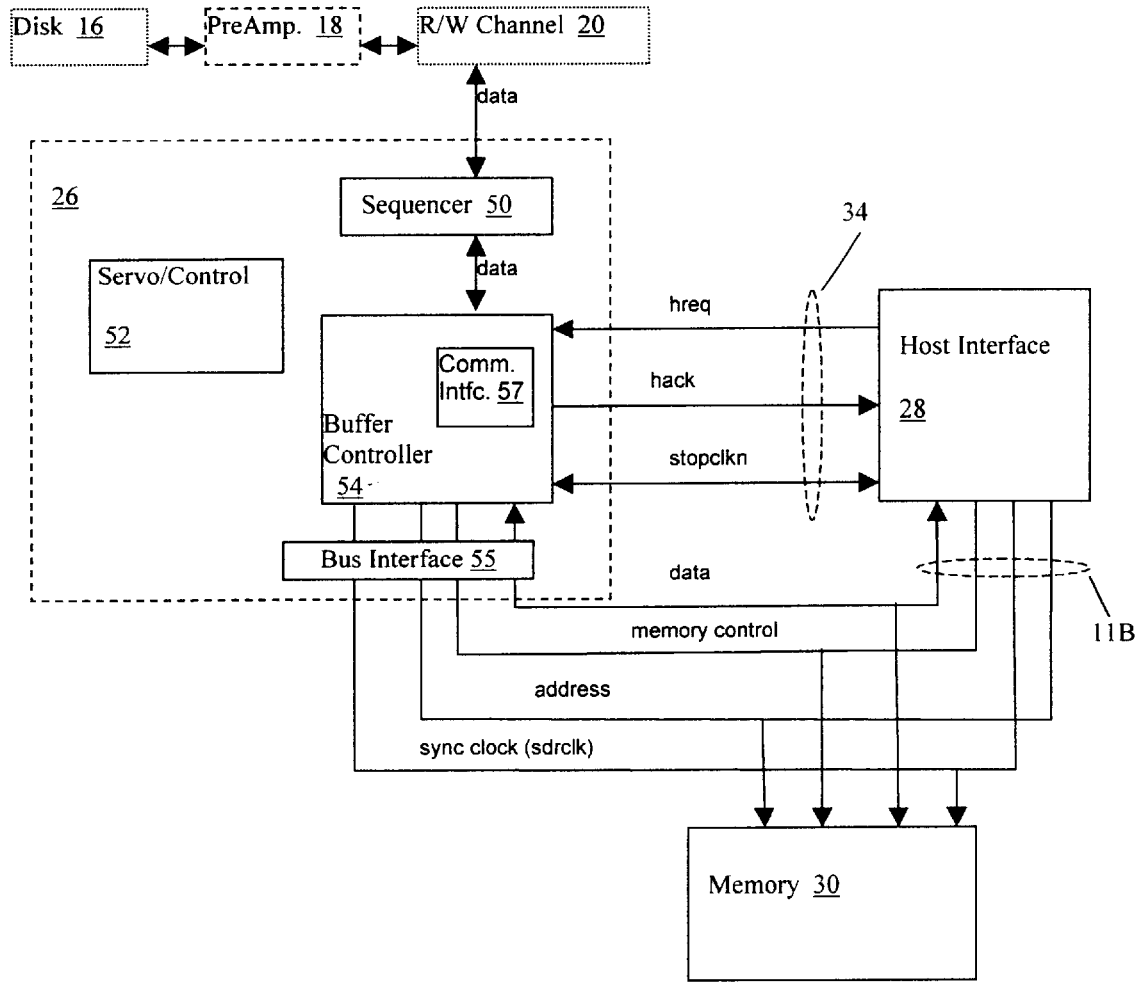
FIG. 6 shows an exemplary block diagram of the architecture of an embodiment of the controller of FIG. 2.

FIG. 6 shows an exemplary block diagram of the architecture of an embodiment of the controller 26 including a sequencer 50 for sequencing data to/from the disk 16 via the preamp 18 and a read/write channel 20, a servo/control 52, and a buffer controller 54 for handshaking with the host interface 28 and controlling the bus 11B to access the buffer memory 30. In one version, the controller 26 includes a bus interface 55 for the buffer controller 54 to control the bus 11B to communicate with the memory 30 over the bus 11B. The controller 26 can further include a communication interface 57 for the buffer controller 54 to communicate with the host interface 28 via the communication lines 34.

Figure 7:
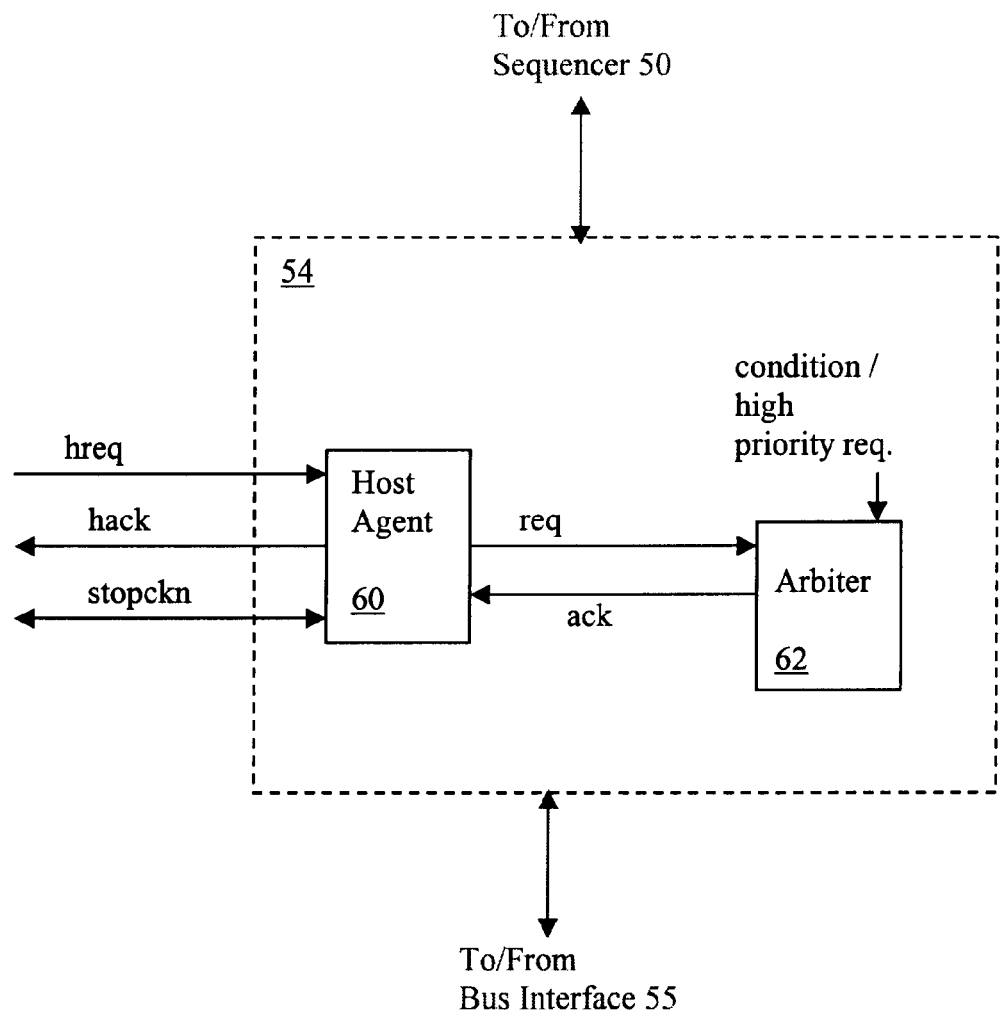
FIG. 7 shows a functional block diagram for the buffer controller of the disk drive controller of FIG. 4 implementing a handshaking function for buffer access according to the present invention.

FIG. 7 shows a functional block diagram for the buffer controller 54 of the controller 26 implementing the handshaking. The buffer controller function includes a host agent 60 and an arbiter 62. The host agent 60 handshakes with the buffer controller 44 of the host interface 28, and transfers control of the bus 11B between the controller 26 and the host interface 28. The arbiter 62 selectively grants requests by the host interface 28 to control the bus 11B for. accessing the buffer memory 30. Upon receiving a request (req) from the host agent 60, indicating a request from the interface controller 28 (HREQ asserted), the arbiter 62 grants the access request based on one or more conditions. In one example, the arbiter 62 determines if a higher priority request for accessing the buffer memory 30 is not present, in which case the arbiter 62 grants/acknowledges (ack) the access request. Thereby, the host agent 60 asserts the HACK signal to inform the host interface 28 that the request has been granted. Thereafter, the arbiter 62 can pre-empt the buffer access of host interface 28 by withdrawing the acknowledgment (ack), whereby the host agent 60 of the buffer controller 54 deasserts the HACK signal, pre-empting the host interface 28 from controlling the bus 11B to access the buffer 30.

Figure 8:
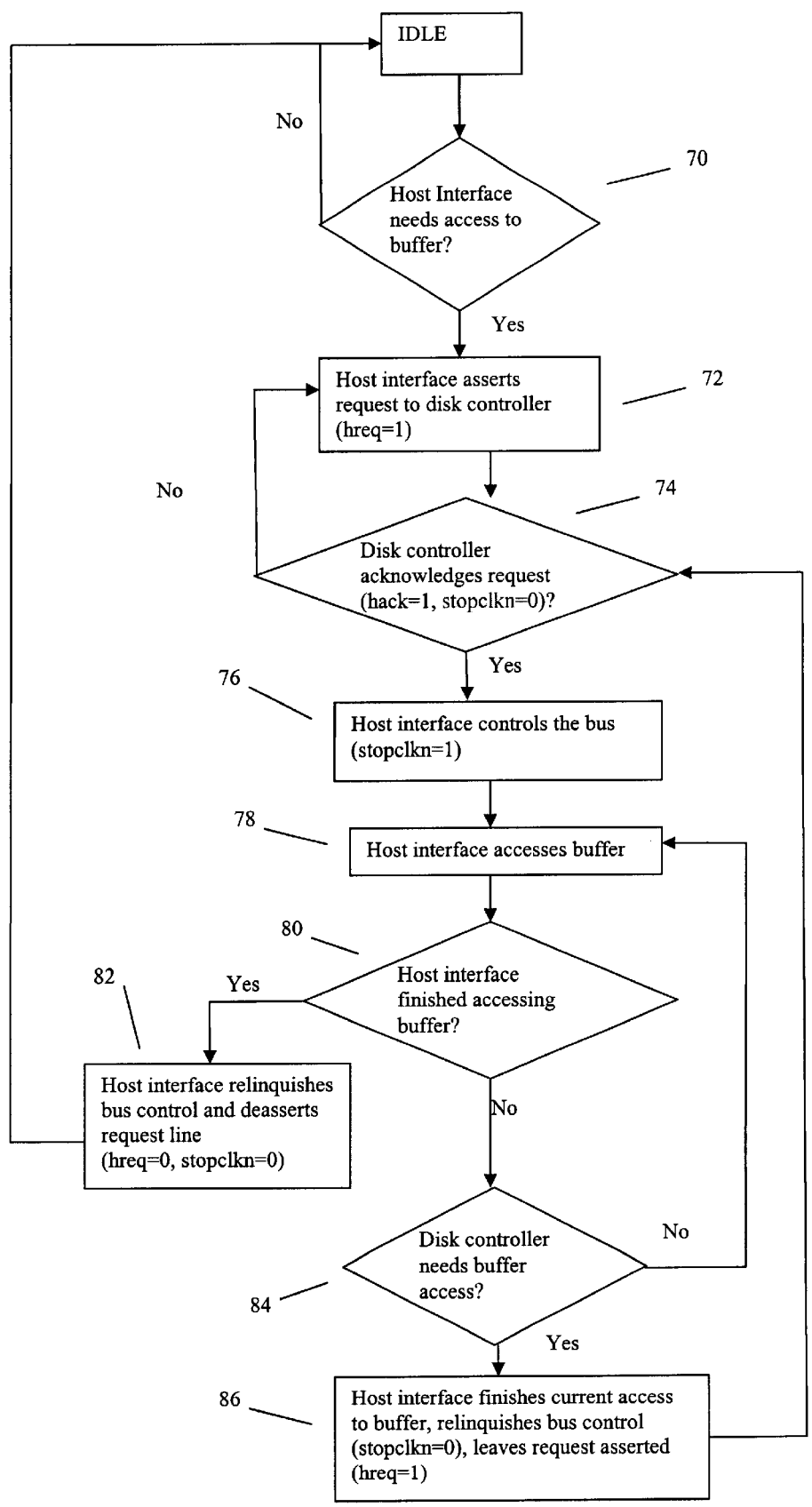
FIGS. 8–9 show exemplary flow diagrams steps performed by the host interface and the controller of FIG. 2, respectively, in an exemplary handshaking buffer access protocol according to the present invention.
Figure 9:
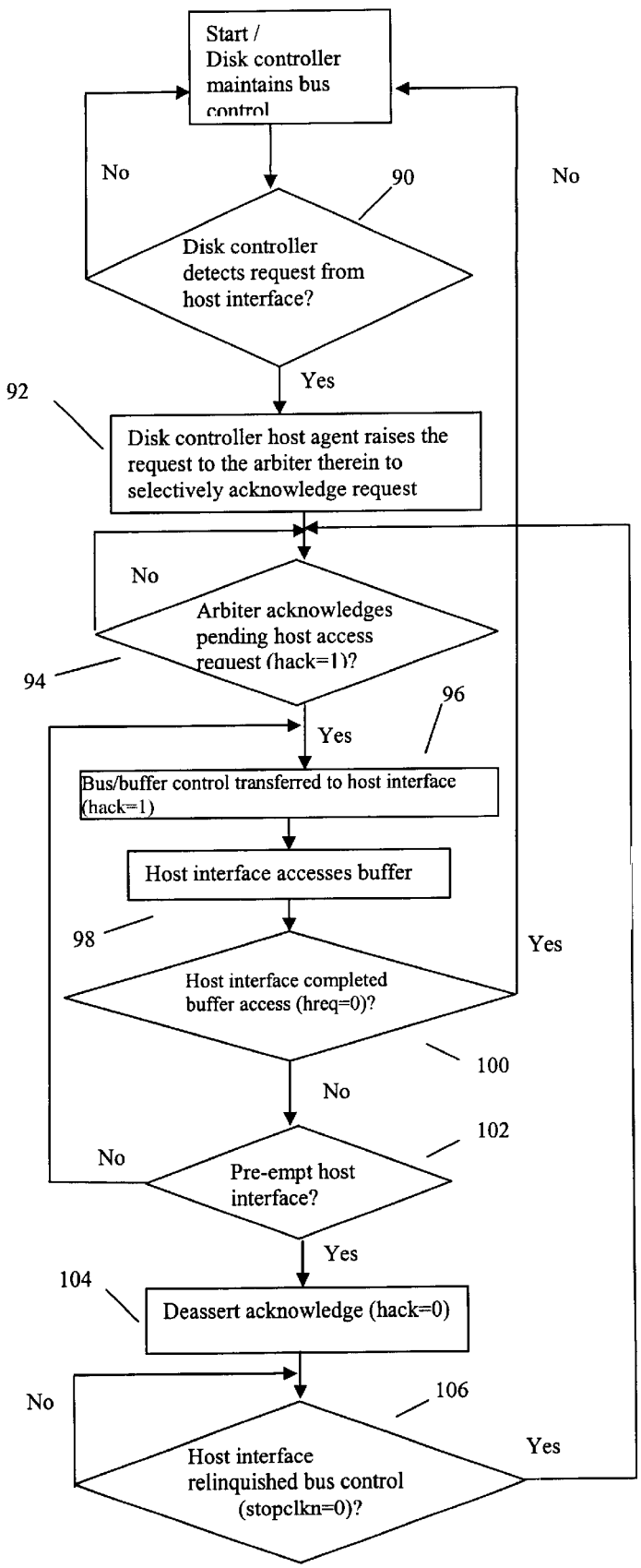

FIGS. 8–9 show example flow diagrams of steps performed by the exemplary host interface 28 and the controller 26 (FIGS. 4–6), respectively, in example handshaking buffer access protocol according to the present invention. The host interface 28 has lower priority for accessing the buffer 30 than the controller 26, and the controller 26 maintains bus control except when the controller 26 grants permission to the host interface 28 to control the bus 11B to access the buffer memory 30. The host interface 28 then controls the bus 11B including all memory control, address and data lines to access the buffer memory 30.

FIG. 8 shows example steps by the host interface 28 (e.g., buffer controller 44 within the host interface 28) for handshaking with the controller 26. When the host interface 28 requires access to the buffer 30 (determined in step 70), it asserts the HREQ signal (step 72), then in a loop examines the HACK signal from the controller 26 to determine if it is asserted (determined in step 74). When the HACK signal is asserted, the host interface 28 drives or controls the bus 11B (step 76) and accesses the buffer 30 (step 78). When the host interface 28 completes accessing the buffer 30 (step 80), the host interface 28 relinquishes the bus 11B by tristating at least the memory control signals, and deasserts the HREQ and STOP.CLKN signals (step 82).

The host interface 28 examines the HACK signal to determine if it remains asserted (HACK=1) to continue memory access. If the host interface 28 is not finished accessing the buffer memory 30 (determined in step 80), the controller 26 can pre-empt the host interface 28 by deasserting the HACK signal, whenever the controller 26 requires control of the bus 11B to access the buffer memory 30. When the host interface 28 detects deassertion of the HACK (i.e., the disk controller 26 needs buffer access) (determined in step 84), the host interface 28 attempts to complete the current buffer access, then tristates the memory control signals and returns bus control to the controller 26 by asserting the STOPCLKN signal (e.g., STOPCLKN=0) (step 86). The host interface 28 maintains the HREQ signal asserted so that the controller 26 can selectively return bus control to the host interface 28 by acknowledging the request when e.g. the controller 26 has completed access to the buffer memory 30.

FIG. 9 shows example steps by the controller 26 (e.g., host agent 60 and arbiter 62) for handshaking with the host interface 28. At the start, the controller 26 maintains control of the bus 11B. When the host agent 60 detects HREQ asserted, indicating buffer access request by the host interface 28 (determined in step 90), the host agent 60 raises the request with the arbiter 62 for the arbiter 62 to selectively acknowledge the request (step 92). If the arbiter 62 grants the request (determined in step 94), the host agent 60 relinquishes bus control, and transfers bus control to the host interface 28 by asserting the HACK signal (step 96). The host interface 28 then can access the buffer (step 98). If the host interface 28 has completed access (determined in step 100), the host interface 28 deasserts the HREQ signal, such that the controller 26 regains control of the bus 11B. If the host interface 28 has not competed memory access, and the controller 26 decides to pre-empt the host interface 28 from buffer access (determined in step 102), then the controller 26 deasserts the HACK signal (step 104), and waits for the host interface to relinquish control of the bus 11B (determined in step 106) for the controller 26 to regain control of the bus 11B.

Figure 10:
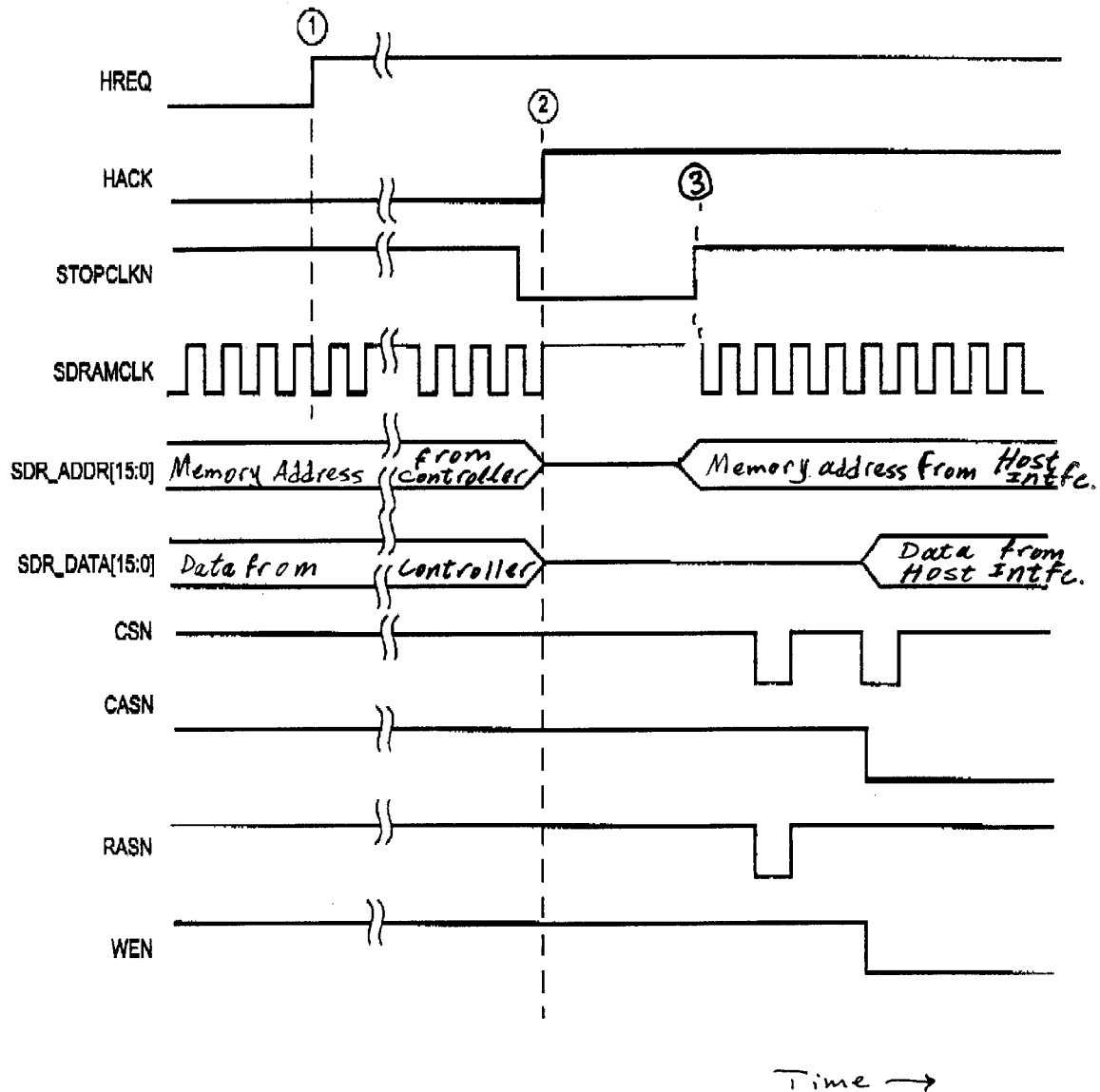
FIGS. 10–12 show exemplary timing diagrams for different operation handshaking scenarios for buffer access between the host interface and the controller of FIG. 2 according to the present invention.
Figure 11:
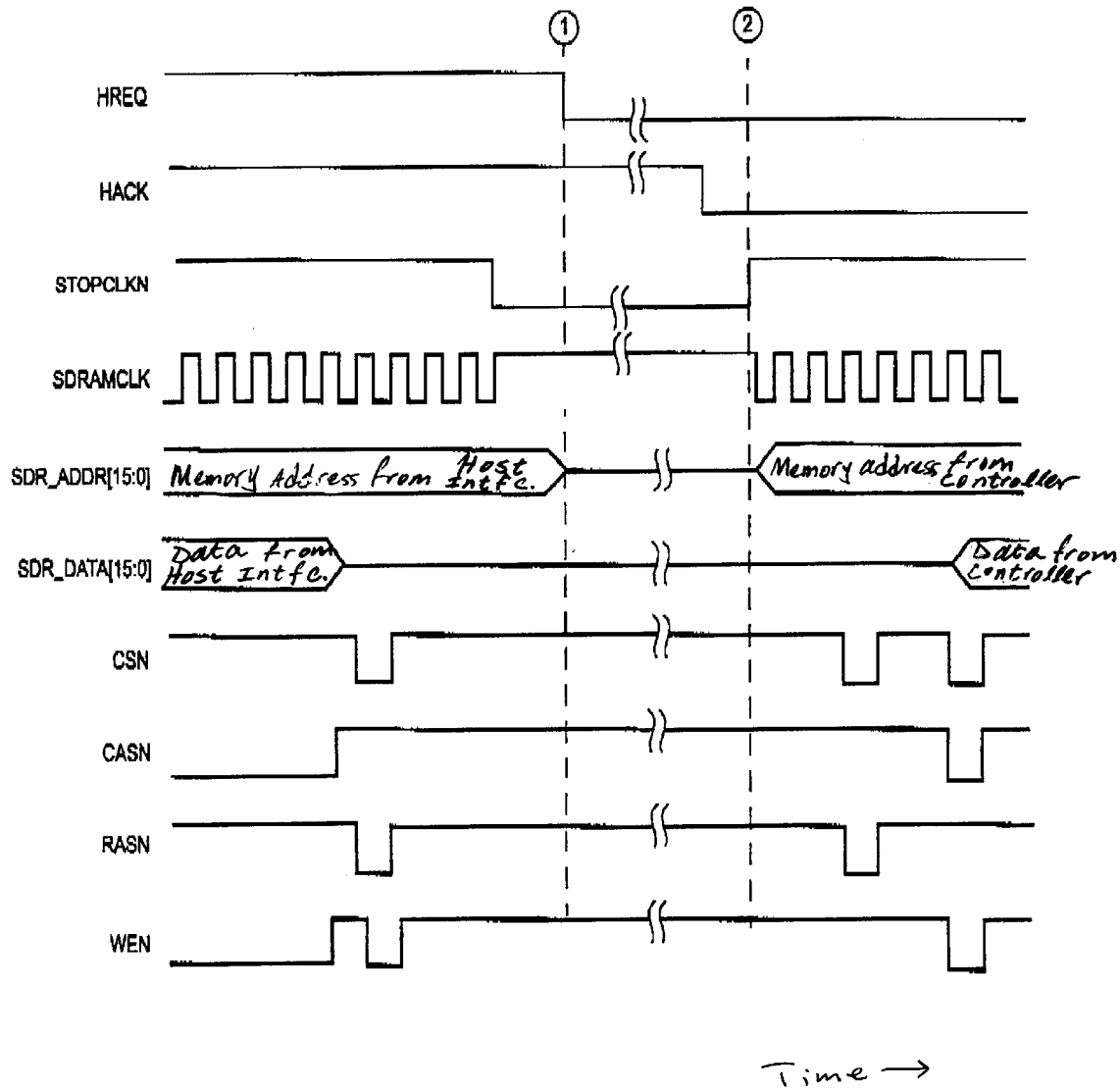
Figure 12:
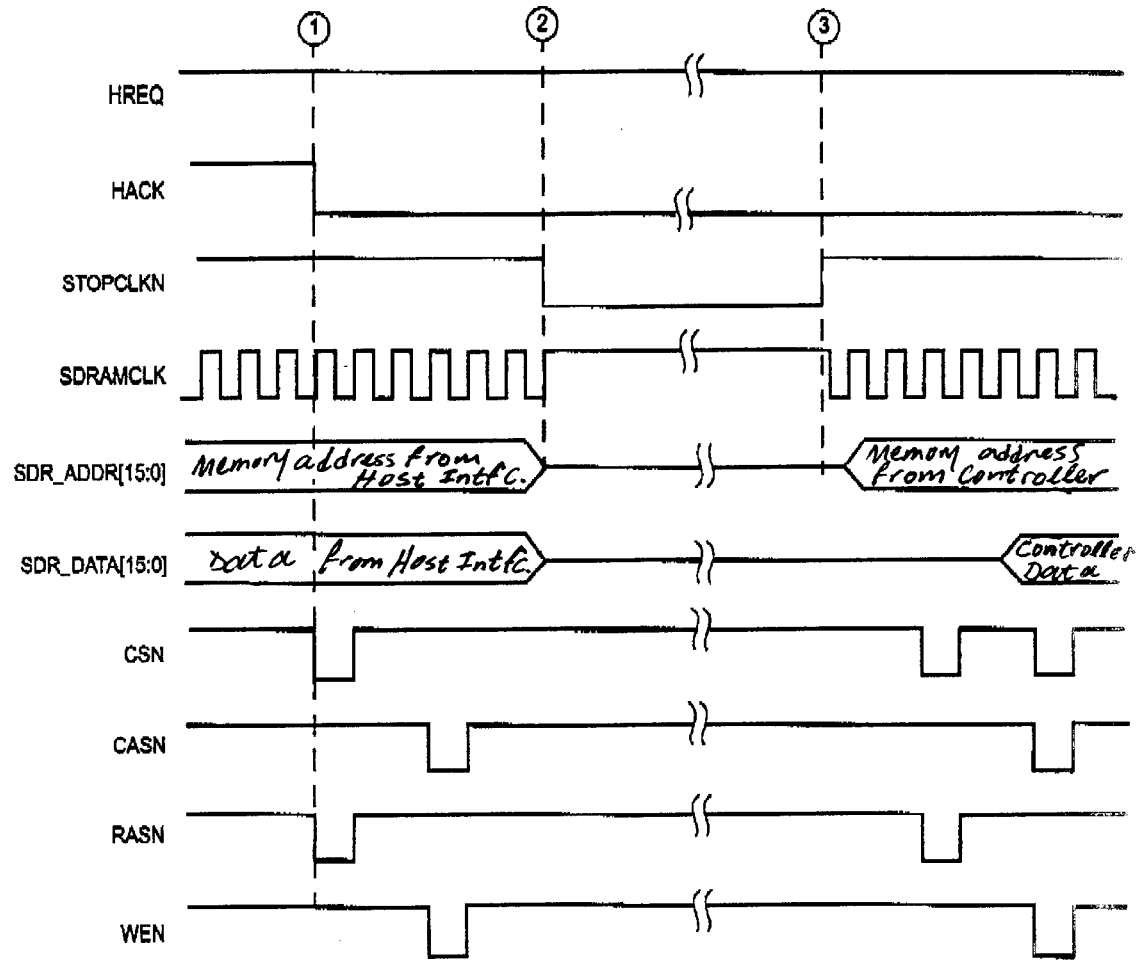

FIGS. 10–12 show example timing diagrams for different operation handshaking scenarios for buffer access between the host interface 28 (Host Intfc.) and the controller 26 (Controller) according to the present invention. In this example, the buffer memory 30 comprises a synchronous DRAM (SDRAM) chip, and the bus 11B. includes the address lines SDR_ADDR, data lines SDR_DATA and memory control lines/signals. The memory control signals include, for example: chip select (CSN), row address enable (RASN), column address enable (CASN), write enable (WEN), upper byte write enable (DQMH), lower byte write enable (DQML), etc. The communication lines/signals 34 between the controller 26 and the host interface 28 include HREQ, HACK, and STOPCLKN.

SDRAMCLK comprises the SDRAM clock (i.e., sdrclk signal) for the memory (output), CSN comprises Chip Select (output—active low), RASN comprises Row Address Strobe or Select (output—active low) to enable SDRAMCLK to clock in a row address, CASN comprises Column Address Strobe or Select (output—active low) to enable SDRAM-CLK to clock in a column address, WEN comprises Write Enable (output—active low) such that when WEN is asserted the host interface 28 outputs data on the SDR_DATA lines, SDR_ADDR[15:0] comprises SDRAM address lines/bus (output), and SDR_DATA[15:0] comprises SDRAM data lines/bus (bi-directional) wherein the SDR_DATA bus is input to the host interface 28 when WEN is not active and output from the host interface 28 when WEN is active.

In the description herein in relation to FIGS. 10–12, 'active' and 'assert' are synonymous, and 'inactive' and 'deassert' are synonymous. Depending on a selected signal convention, active/assert can be e.g. level 0 (or level 1). For example, STOPCLKN is an active/assert low signal, so that when STOPCLKN is active/asserted its signal level is 0, and when STOPCLKN is inactive/deasserted its signal level is 1. In another example, HACK is an active/asserted high signal so that when it is active/asserted, its signal level is 1. The sets of references $\hat{1}$, $\hat{2}$, $\hat{3}$ in each of the FIGS. 3 and 10–12, do not necessarily designate the same events or times.

Referring to the example timing diagram in FIG. 10, the host interface 28 asserts HREQ, and upon detecting HACK asserted and STOPCLKN deasserted by the controller 26, the host interface 28 drives the buffer memory 30 inputs via the bus 11B. The host interface 28 asserts the HREQ signal at $\hat{1}$ to request bus control is from the controller 26. At $\hat{2}$ the controller 26 tristates data, address and memory control lines to the buffer memory 30 in the bus 11B, then asserts HACK and STOCLKN signals, whereby the host interface 28 is granted control of the bus 11B to access the buffer memory 30. After detecting the assertion of both the HACK and STOPCLKN signals, the host interface 28 can deassert STOPCLKN to signal that the host interface 28 is now driving the bus 11B, and access the buffer memory 30. More specifically, the controller 26 asserts STOPCLKN (e.g., drives STOPCLKN low) and then tristates STOPCLKN (e.g., the controller 26 stops driving STOPCLKN, and using a pull down resistor STOPCLKN stays low even though the controller 26 already tristates STOPCLKN). The host interface 28 detects assertion (e.g., low level) of STOPCLKN, and then at $\hat{3}$ then deasserts STOPCLKN (e.g., drives TOPCLKN high) and gains control of the bus 11B.

In this description, STOPCLKN, stpclkn, CKE and bus relinquish signals are the same. The STOPCLKN (CKE) signal is used by both the host interface 28 and the controller 26 for bus control. For example, before the host interface 28 takes over control of the SDRAM bus 11B, it checks STOPCLKN, and if stpclkn is asserted/active (e.g., 0 level) then the bus 11B is available for use and the host interface 28 deasserts stpclkn (e.g., level 1) to signal the controller 26 that the bus 11B is unavailable to prevent contention, and the host interface 28 assumes control of the bus 11B. In one version, the same process is followed when the controller 26 wants to take over control of the bus 11B to access the buffer 30.

Referring to the example timing diagram in FIG. 11, after completing access to the buffer memory 30 the host interface 28 voluntarily relinquishes bus control, wherein at $\hat{1}$ the host interface 28 raises SDRAMCLK high then tristates it, asserts STOPCLKN (e.g., takes STOPCLKN low, STOPCLKN=0) then tristates it, puts data, address and memory control lines to the buffer memory 30 in bus 11B to an inactive state and then tristates them, and deasserts HREQ. After detecting deassertion of HREQ and STOPCLKN, the controller 26 deasserts HACK, and can start access to the buffer memory by deasserting STOP- CLKN at $\hat{2}$ (e.g., drives STOPCLKN high, STOPCLKN=1) to prevent contention for the bus 11B.

Referring to the example timing diagram in FIG. 12, the controller 26 pre-empts the host interface 28 after transferring control to the host interface 28. To regain control of the bus 11B, the controller 26 deasserts HACK at $\hat{1}$. Then, after detecting deassertion of HACK, the host interface 28 finishes current buffer access (if any), and at $\hat{2}$ raises SDRAMCK high and thereafter tristates it, and also at 2 asserts STOPCLKN (e.g., takes STOPCLKN low, STOPCLKN=0) and thereafter tristates it, and places data, address and memory control lines to the buffer memory 30 in bus 11B into inactive state and then tristates them. Having detected STOPCLKN asserted (e.g., STOPCLKN is low, STOPCLKN=0), at $\hat{3}$ the controller 26 can begin controlling the bus 11B, for buffer access. The host interface 28 can maintain the HREQ request signal asserted if it needs to access the buffer memory 30, wherein the controller 26 can selectively acknowledge the request, such as when completed accessing the buffer memory 30. The above examples are for illustration only, and other operational scenarios according to the present invention are possible.

An advantage of disk drive 10 is that the controller 26 handles data transfer between the buffer 30 and the disks, and the host interface 28 handles data transfer between the buffer 30 and the host. As such, in one implementation, the disk drive 10 can be used in different AV systems.(e.g., DVCR), wherein AV related changes are made to the host interface 28 only, which saves unnecessary redesign of the controller 26. As such, the controller 26 can include functions common for both AV related applications and for systems such as general purpose computers. Uncommon functions required for supporting host data transfer for different hosts (e.g., DRAM buffer access requirements for data transfer between the host and the DRAM buffer) are included in the host interface 28. As such, the disk drive 10 can be used in conjunction with a new host system with only a change to the host interface 28 to include a host data transfer function required for the host system. A new disk drive controller ASIC 26 is not required everytime the disk drive 10 is used in a new host system with new features not included in the disk drive controller ASIC 26. This decreases the disk drive controller ASIC 26 redesign cycles, decreasing costs.

In one example implementation, each of the controller 26 and the host interface 28 is implemented as a logic circuit configured to perform the protocol and function steps described herein. In that case, the buffer controller 44 comprises a control logic circuit configured for performing the steps and functions described herein for access to the memory 30. Similarly, the buffer controller 54 comprises a buffer logic circuit configured for performing the steps and functions described herein for access to the memory 30. The various logic circuits can be configured according to instructions implementing the memory access steps, functions and protocols described herein according to the present invention. As described herein each logic circuit can comprise e.g. an application specific integrated circuit (ASIC). An ASIC is a device designed to perform a specific function as opposed to a device such as a microprocessor which can be programmed to perform a variety of functions. The circuitry for making the chip programmable is eliminated and only those logic functions needed for a particular application are incorporated. As a result, the ASIC has a lower unit cost and higher performance since the logic is implemented directly in the chip rather than using an instruction set requiring multiple clock cycles to execute. An ASIC is typically fabricated using CMOS technology with custom, standard cell, physical placement of logic (PPL), gate array, or field programmable gate array (FPGA) design methods.

In another example, each logic circuit can include a processor, wherein program instructions and data implement the functions and steps described herein to program processors. Other means, comprising memory devices, processors, logic circuits, and/or analog circuits, for performing the steps taken by the controllers (e.g., host interface 28, controller 26, etc.) for access to the memory 30 according to the present invention are possible and contemplated by the present invention. Therefore, the controllers according to the present invention should not be limited to the descriptions of the versions described herein.

Figure 13:
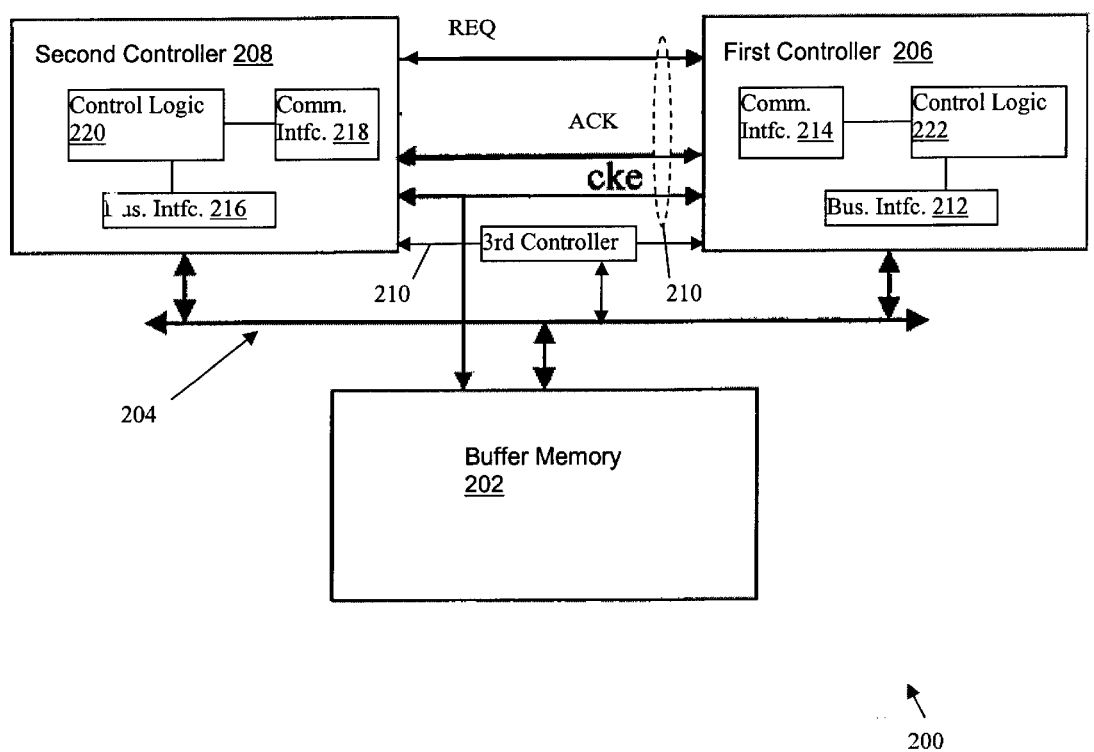
FIG. 13 shows an exemplary block diagram of an embodiment of the architecture of a control system for controlling access to a shared memory via a bus, according to the present invention.

Though in the example embodiments described hereinabove, a shared memory control system and memory access protocol according to the present invention is described in conjunction with a disk drive 10, such a control system and protocol can be equally utilized in any system for providing access to a shared memory device to two or more controllers interconnected to the memory device via a bus. FIG. 13 shows an exemplary block diagram of an embodiment of the architecture of a control system 200 for controlling access to a shared memory 202 by two or more controllers, according to the present invention. The control system 200 comprises a bus 204 connected to the buffer memory 202, a first controller 206 connected to the bus 204 for accessing the buffer memory 202 to transfer data between the first controller 206 and the buffer memory 202 via the bus 204, a second controller 208 connected to the bus 204 for accessing the memory 202 to transfer data between the second controller 208 and the memory 202 via the bus 204, and communication lines 210 connecting the first and the second controllers 206, 208 respectively, for communication and handshaking between the first and the second controllers 206, 208 for accessing the memory 202. The bus 204 can include e.g. memory control lines/signal, memory address lines/signals, memory data lines/signals, memory enable/disable lines/signals, memory read/write selection signals/lines, etc.

In one version, the first controller 206 can include a bus interface 212 for communicating with the memory 30 over the bus 204. The first controller 206 can further include a communication interface 214 for communicating with the second controller 208 via the communication lines 210. Similarly, the second controller 208 can include a bus interface 216 for communicating with the memory 30 over the bus 204. The second controller 208 can further include a communication interface 218 for communicating with the first controller 206 via the communication lines 210

Figure 14:
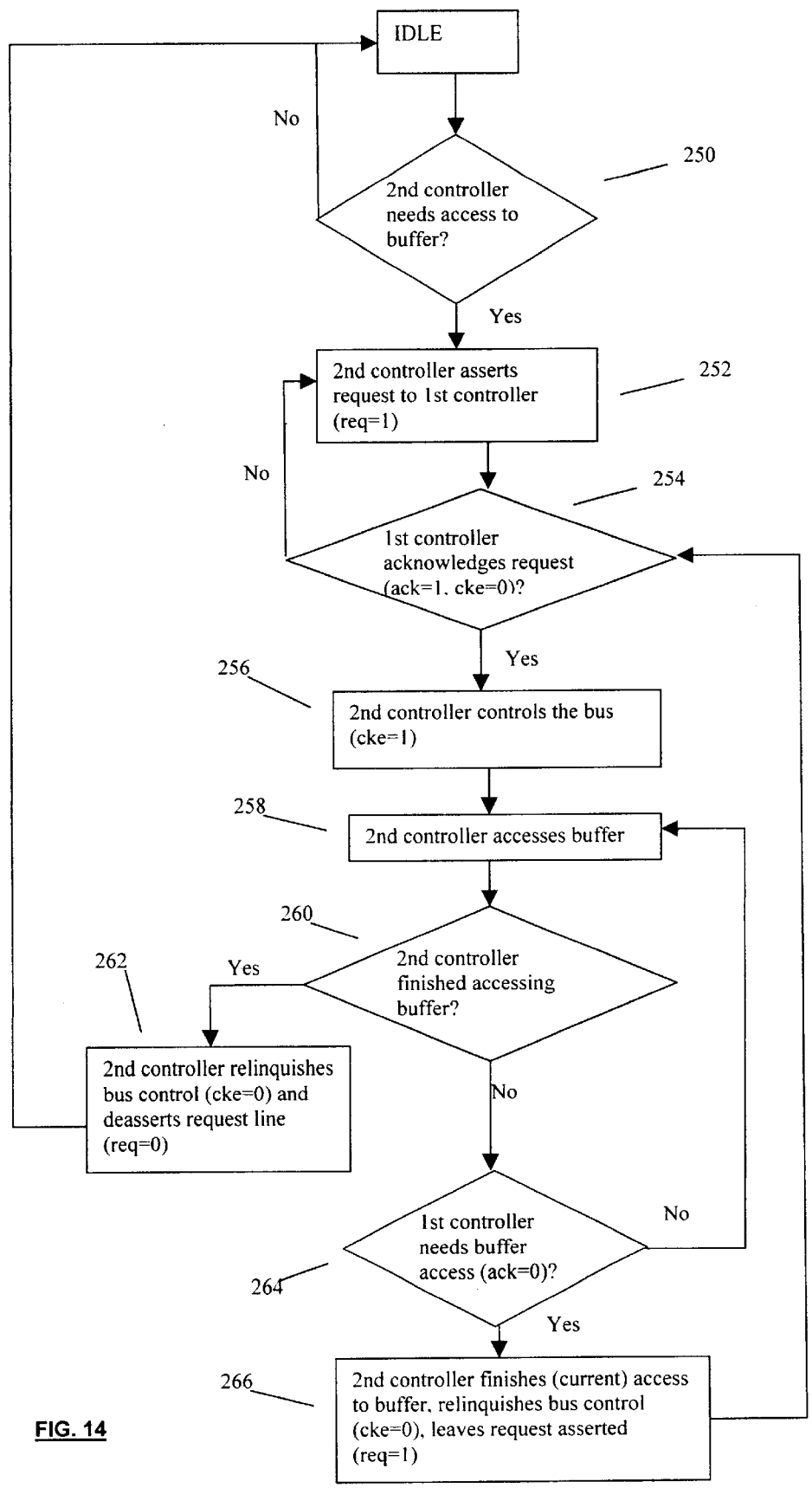
FIGS. 14–15 show exemplary flow diagrams of an embodiment of steps performed by the first and second controllers of FIG. 13, respectively, in an exemplary handshaking buffer access protocol according to the present invention.
Figure 15:
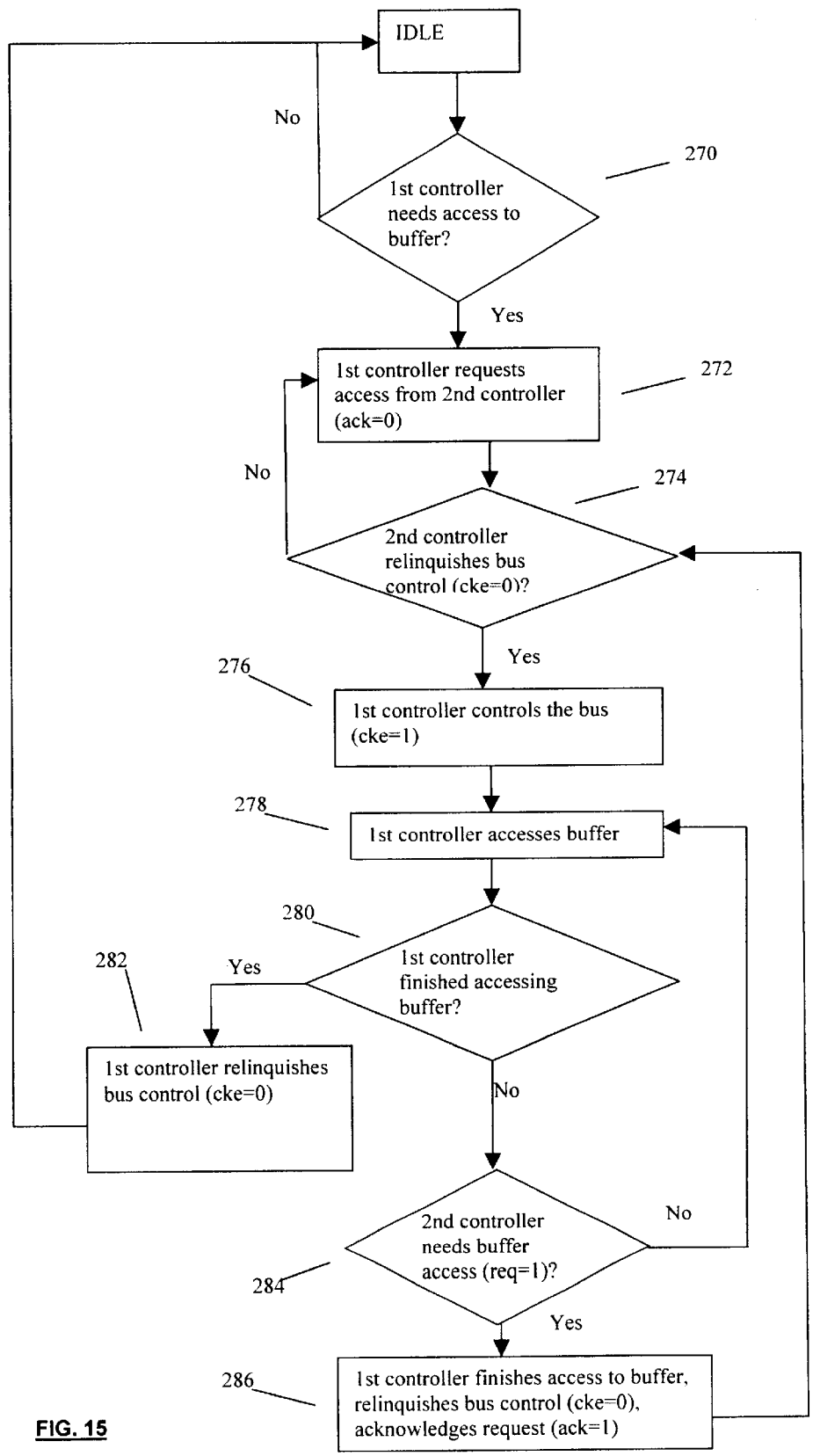

FIGS. 14–15 show example flow diagrams of an embodiment of steps performed by the first and second controllers 206, 208 of FIG. 13, respectively, in example handshaking buffer access protocol according to the present invention. The second controller 208 includes a control logic circuit 220 (FIG. 13) configured such that when the second controller 208 needs access to the buffer memory 202 (determined in step 250 in FIG. 14), the second controller 208 transmits an access request (REQ or req) to the first controller 206 via the communication lines 210 for control of the bus 204 to access the memory 202 (step 252), and selectively detects grant of the access request (e.g., transmitting an acknowledge (ACK) and CKE asserted) by the first controller 206 (determined in step 254) in response, indicating that the second controller 208 can control the bus 204 to access the buffer memory 202. Thereupon, the second controller 208 controls the bus 204. (asserts CKE) (step 256)

and accesses the memory 202 (step 258). The first controller 206 further includes a control logic circuit 22 (FIG. 13) configured for: selectively granting the access request of the second controller 208, and communicating grant of the access request to the second controller 208 via the communication lines 210 (e.g., transmitting an acknowledge (ACK)).

Thereafter, upon completing access to the memory 202 (determined in step 260), in one example the second controller 208 relinquishes control of the bus 204 (deasserts CKE and req) and leaves the bus available for control by the first controller 206 (step 262). In one version, when the second controller 208 detects an access request from the first controller 206, while the second controller 208 is in control of the bus 204, the second controller 208 selectively grants the access request of the first controller 206 based on condition(s) including e.g.: the second controller 208 is no longer accessing the memory 202, the second controller 208 no longer needs to maintain control of the bus 204, the second controller 208 does not have higher priority memory access needs than the first controller 206, the second controller has performed a predetermined number of data transfers to/from the memory 202, etc. As shown in FIG. 14, if while in control of the bus 204, or while accessing the memory 202, the second controller 208 detects a memory access request from the first controller 206 (determined in step 264), and the second controller 208 has not completed memory access, the second controller 208 can either complete all memory access and then transfer control to the first controller 206, or finish its current memory access without completing its remaining memory access requirements, and transfer control to the first controller 206 (step 266). In the latter case, the second controller 208 can leave a pending request to signal the first controller 206 to return control back to the second controller 208 to complete its memory access.

In one implementation of handshaking between the first and second controllers 206, 208 via the communication lines 210 including request (REQ) and acknowledge (ACK) signals, when the second controller 208 requires access to the buffer memory 202, the second controller 208 sends an access request to the first controller by asserting the request line REQ of the communication lines 210 to request bus control. The control logic circuit 222 of the first controller 206 is configured to detect the REQ asserted, and selectively grants the access request of the second controller 208, relinquishes bus control, and transmits an acknowledge to the second controller by asserting the acknowledge line ACK, to transfer bus control to the second controller 208. After receiving control of the bus 204 from the first controller 206, and completing access to the memory 202, the second controller 208 relinquishes bus control and deasserts the request line HREQ to signal bus control transfer back to the first controller 206. Alternatively, the second controller 208 can maintain control of the bus 204 after completing its memory access until detecting a condition such as e.g. an access request (or demand) by the first controller 206.

Referring to FIG. 15, in one version, the control logic circuit 222 (FIG. 13) of the first controller 206 is further configured such that when the first controller 206 requires access to the memory 202 (determined in step 270), the first controller transmits an access request to the second controller 208 via the communication lines 210 for bus control (step 272), waits for communication (e.g., acknowledge) from the second controller 208 indicating grants of the access request 208 (determined in step 274) and then controls the bus 204 (step 276) to access the memory buffer 202 (step 278). The control logic circuit 218 (FIG. 13) of the second controller 208 is configured for (selectively) granting the access request of the first controller 206 and upon granting the access request: (1) relinquishing bus control and (2) communicating grant of the access request (e.g., transmitting an acknowledge) to the first controller 206 via the communication lines 210.

Thereafter, upon completing access to the memory 202 (determined in step 280), in one example, the first controller 206 relinquishes control of the bus 204 (deasserts CKE) and leaves the bus available for control by the second controller 208 (step 282). If while in control of the bus 204, or while accessing the memory 202, the first controller 206 detects a memory access request (req asserted) from the second controller 208 (determined in step 284), the first controller 206, based on at least on one condition, selectively grants access to the second controller 208. Such condition(s) can include e.g., the first controller 206 is no longer accessing the memory 202, the first controller 206 no longer needs to maintain control of the bus 204, the first controller 206 does not have higher priority memory access needs than the second controller 208, etc. Other conditions for the first controller 206 are possible and can be e.g. based on desired control system operation and performance. For example, as shown in FIG. 15, if upon detecting an access request from the second controller 208, the first controller 206 has not completed memory access, the first controller 206 can grant the access request after e.g. either completing all its pending memory accesses requirements, and then transferring bus control to the second controller 208, or finishing its current memory access without completing its remaining pending memory access requirements, and transferring control (CKE deasserted and ACK asserted) to the second controller 208 (step 286). In the latter case, the first controller 206 can leave a pending request to signal the second controller 208 to return control back to the first controller 206 to complete its memory access.

In one version of the control system 200, the control logic circuit 222 of the first controller 206 is configured for relinquishing control of the bus 204 upon granting the access request, and then transmitting the acknowledge to the second controller 208 via the communication lines 210. As described herein, in one implementation, relinquishing control of the bus 204 (relinquishing bus control) includes placing the bus 204 in tristate (e.g., placing at least the memory control lines in bus 204 in tristate).

In another version of the control system 200, when the first controller 206 requests access to the memory 30 from the second controller 208, the second controller 208 treats the access request of the first controller as a demand, and grants that access request unconditionally at the first possible moment. For example, upon detecting an access request/demand from the first controller 206, the second controller 208 completes its current memory access regardless of any pending memory access requirements of the second controller 208, and transfers bus control back to the first controller 206 by relinquishing bus control and sending an acknowledge to the first controller 206.

Additionally, the first controller 206 (master) can have a first priority for accessing the buffer memory 202 (slave), and the second controller can have a second priority for accessing the buffer memory 202, such that the second priority is lower than the first priority. As such, generally the first controller 206 maintains bus control and only transfers bus control to the second controller 208 when the second controller requests access and the first controller 206 decides to grant the access (e.g., based on detecting a condition as described above). For example, in one implementation, the control logic circuit 222 of the first controller 206 is configured for granting the access request of the second controller 208 e.g. only after the first controller 206 has completed all its pending memory access requirements, otherwise the first controller 206 maintains control of the bus 204. The second controller 208 returns bus control to the first controller 206 upon request/demand by the first controller 206 unconditionally, as described. Further, the second controller 208 automatically returns bus control to the first controller 206 upon the second controller 208 completing its memory access even if the second controller 208 does not receive a request/demand for bus control from the first controller 206.

In one implementation, the second controller 208 sends an access request to the first controller by e.g. asserting the request line REQ of the communication lines 210 to request bus control, and upon detecting REQ asserted, the first-controller 206 selectively grants the request and places the bus 204 in tristate and transmits an acknowledge to the first controller 206 by e.g. asserting the acknowledge line ACK of the communication lines 210 to transfer bus control to the second controller 208. When the first controller 206 needs access to the buffer memory 202, to regain control of the bus 204, the first controller 206 transmits an access request to the second controller 208 by e.g. deasserting the acknowledge signal ACK, and upon detecting the ACK signal deasserted, the second controller 208 relinquishes bus control by placing the bus 204 in tristate, and transmits an acknowledge to the first controller 206 by e.g. deasserting the request line REQ. In addition to the assert/deassert of the communication lines 210 for handshaking between the first and second controllers 206, 208, described herein by example, other methods of sending request and acknowledge signals between the first and second controllers 206, 208 for handshaking to implement access control to the shared memory 202 according to the present invention, are contemplated by the present invention.

Further, the control system architectures and protocols shown and described herein in relation to FIGS. 1–12 and with respect to the host interface 28 and the controller 26 in FIG. 2, are examples of the control system 200, and should not be viewed as limiting the implementation, function or application of the control system 200. As such, the controller 26 is an example of the first controller 206, the host interface 28 is an example of the second controller 208, the shared memory 30 is an example of the shared memory 202, the memory bus 11B is an example of the bus 204, and the communication lines 34 are examples of the communication lines 210. Further, with respect to the host interface 28 and the second controller 208, the buffer controller 44 is an example of the control logic 220, the bus interface 45 is an example of the bus interface 216 and the communication interface 47 is an example of the communication interface 218. And, with respect to the controller 26 and the first controller 206, the buffer controller 54 is an example.of the control logic 22, the bus interface 55 is an example of the bus interface 212, and the communication interface 57 is an example of the communication interface 214. Further, the example descriptions, steps, functions, flow diagrams, timing diagrams, etc. described herein in relation to FIGS. 1–12 apply equally to the control system 200, its components and implementations thereof, and therefore are not described again.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A method of providing access to a shared memory interconnected to at least a first controller and a second controller via a bus including memory address lines, the bus for transferring data between the first controller and the memory, and between the second controller and the memory, the first and second controllers having communication lines therebetween for communication and handshaking between the first and second controllers for controlling the accessing of the memory via the bus, the method comprising the steps of:

(a) the second controller transmitting an access request to the first controller via the communication lines for control of the bus to access the memory;

(b) the first controller selectively granting the access request;

(c) upon granting the access request, the first controller transmitting an acknowledge to the second controller via the communication lines; and (d) upon detecting the acknowledge, the second controller providing a memory address on the memory address lines and accessing the memory.

2. The method of claim 1, wherein:

the first controller has a first priority for accessing the memory, and the second controller has a second priority for accessing the memory, said second priority being lower than said first priority; and step (b) comprises the step of: the first controller selectively granting the access request only after completing its access to the memory.

3. The method of claim 1, wherein:

the first controller has a first priority for accessing the memory, and the second controller has a second priority for accessing the memory, said second priority being lower than said first priority;

step (b) comprises the steps of: the first controller maintaining control of the bus for accessing the memory, and upon detecting an access request from the second controller, the first controller selectively granting access to the second controller; and the method further comprises the step of: (e) the second controller returning control of the bus back to the first controller upon detecting an access request from the first controller.

4. The method of claim 1, wherein step (b) of the first controller granting the access request further includes the steps of the first controller relinquishing control of the bus by placing the bus in tristate to relinquish control of the bus.

5. The method of claim 1, wherein step (b) further comprises the steps of: the first controller detecting presence of a condition, and if said condition is present, then granting access to the second controller.

6. The method of claim 1, wherein:

step (c) further includes the steps of: upon granting the access request of the second controller, the first controller relinquishing control of the bus, and then transmitting said acknowledge to the second controller via the communication lines.

7. The method of claim 6, wherein the step of the first controller relinquishing control of the bus includes the step of the first controller placing the bus in tristate to relinquish control of the bus.

8. The method of claim 1, further comprising the step of:
(e) the second controller relinquishing control of the bus after completing access to the memory.

9. The method of claim 8, wherein:
step (e) of the second controller relinquishing control of the bus includes the step of the second controller placing the bus in tristate.

10. The method of claim 8, wherein:
the communication lines between the first and second controllers include at least a request line and an acknowledge line;
step (a) of the second controller transmitting an access request to the first controller includes the step of the second controller asserting the request line to request control of the bus;
step (c) of the first controller transmitting an acknowledge to the second controller includes the step, of the first controller asserting the acknowledge line, and
step (e) further includes the step of the second controller deasserting the request line after finishing access to the memory.

11. The method of claim 1, further comprising the steps of:
(e) the first controller transmitting an access request to the second controller via the communication lines for control of the bus to access the memory;
(f) the second controller granting the access request from the first controller;
(g) upon granting the access request from the first controller, the second controller: (1) relinquishing control of the bus and (2) transmitting an acknowledge to the first controller via the communication lines; and
(h) upon receiving the acknowledge from the second controller, the first controller providing a memory address and accessing the memory.

12. The method of claim 11, wherein step (g)(1) of relinquishing control of the bus further includes the step of: the second controller placing the bus in tristate to allow control of the bus by the first controller.

13. The method of claim 11, wherein:
the communication lines between the first and second controllers include at least a request line, an acknowledge line and a bus relinquish line;
step (a) of the second controller transmitting an access request to the first controller includes the step of the second controller asserting the request line to request control of the bus;
step (b) of the first controller selectively granting the access request includes the second controller relinquishing control of the bus;
step (c) of the first controller transmitting an acknowledge to the second controller includes the steps of the first controller asserting the acknowledge line and asserting the bus relinquish line to transfer control of the bus to the second controller;
step (d) of the second controller accessing the memory further includes the step of the second controller deasserting the bus relinquish line to communicate that the second controller is in control of the bus before accessing the memory;
step (e) of the first controller transmitting an access request to the second controller via the communication lines includes the step of the first controller deasserting the acknowledge line to regain control of the bus; and
step (g)(2) of the second controller transmitting an acknowledge to the first controller includes the steps of the second controller asserting the bus relinquish line to communicate that the second controller has relinquished control of the bus, whereupon the first controller takes control of the bus.

14. The method of claim 11, wherein:
the communication lines between the first and second controllers include at least a request line, an acknowledge line;
step (a) of the second controller transmitting an access request to the first controller includes the steps of the second controller asserting the request line to request control of the bus;
step (b) of the first controller selectively granting the access request includes the second controller relinquishing control of the bus;
step (c) of the first controller transmitting an acknowledge to the second controller includes the step of the first controller asserting the acknowledge line to transfer control of the bus to the second controller;
step (e) of the first controller transmitting an access request to the second controller via the communication lines includes the step of the first controller deasserting the acknowledge line to regain control of the bus;
step (g)(2) of the second controller transmitting an acknowledge to the first controller includes the step of the second controller deasserting the request line.

15. A control system for controlling access to a shared memory, the control system comprising:
a bus connected to the memory;
a first controller connected to the bus for accessing the memory to transfer data between the first controller and the memory via the bus;
a second controller connected to the bus for accessing the memory to transfer data between the second controller and the memory via the bus;
communication lines connecting the first and second controllers for communication and handshaking between the first and second controllers for controlling the accessing of the memory;
wherein the second controller includes a control logic circuit configured for: transmitting an access request to the first controller via the communication lines for control of the bus to access the memory, and upon detecting an acknowledge from the first controller in response to the access request, providing a memory address and accessing the memory; and
wherein the first controller includes a control logic circuit configured for: selectively granting the access request from the second controller, and transmitting the acknowledge to the second controller via the communication lines in response to the access request.

16. The control system of claim 15, wherein:
the first controller has a first priority for accessing the memory, and the second controller has a second priority for accessing the memory, said second priority being lower than said first priority; and
the control logic circuit of the first controller is configured for granting the access request only after completing memory access.

17. The control system of claim 15, wherein:
the first controller has a first priority for accessing the memory, and the second controller has a second priority for accessing the memory, said second priority being lower than said first priority;
the first controller maintains control of the bus for accessing the memory, and upon detecting an access request from the second controller, the first controller selectively grant access to the second controller; and
the second controller returns control of the bus back to the first controller upon detecting an access request from the first controller.

18. The control system of claim 15, wherein:
the control logic circuit of the first controller is further configured for relinquishing control of the bus upon granting said access request, and then transmitting said acknowledge to the second controller via the communication lines.

19. The control system of claim 18, wherein the first controller places the bus in tristate to relinquish control of the bus upon granting the access request.

20. The control system of claim 18, wherein in response to an access request from the second controller, the control logic circuit of the first controller detects presence of a condition, and if said condition is present, then grants access to the second controller.

21. The control system of claim 15, wherein:
the control logic circuit of the first controller is further configured such that, upon granting the access request of the second controller, the first controller relinquishes control of the bus, and then transmits said acknowledge to the second controller via the communication lines.

22. The control system of claim 15, wherein the first controller relinquishes control of the bus by placing the bus in tristate.

23. The control system of claim 22, wherein:
the bus includes data, address and memory control lines for access to the memory by the first and second controllers; and
the control logic circuit of the first controller places at least the memory control lines in tristate.

24. The control system of claim 15 wherein the control logic circuit of the second controller is further configured to relinquish control of the bus after completing access to the memory.

25. The control system of claim 24, wherein the control logic circuit of the second controller places the bus in tristate to relinquish control of the bus.

26. The control system of claim 24, wherein:
the communication lines between the first and second controllers include a request line and an acknowledge line;
the control logic circuit of the second controller sends the access request to the first controller by asserting the request line to request control of the bus, and deasserts the request line after completing access to the memory; and
the control logic circuit of the first controller transmits the acknowledge to the second controller by asserting the acknowledge line to transfer control of the bus to the second controller.

27. The control system of claim 15, wherein:
the control logic circuit of the first controller is further configured for transmitting an access request to the second controller via the communication lines for control of the bus to access the memory, and upon receiving an acknowledge from the second controller, providing a memory address and accessing the memory; and
the control logic circuit of the second controller is further configured for granting the access request of the first controller and upon granting that access request: (1) relinquishing control of the bus and (2) transmitting an acknowledge to the first controller via the communication lines.

28. The control system of claim 27, wherein the second controller relinquishes control of the bus by placing the bus in tristate.

29. The control system of claim 27, wherein:
the communication lines between the first and second controllers include at least a request line, an acknowledge line and a bus relinquish line;
when requiring access to the memory, the second controller sends an access request to the first controller by asserting the request line to request control of the bus, and the first controller selectively grants that access request and thereupon relinquishes control of the bus, asserts the bus relinquish line and asserts the acknowledge line, whereby the second controller deasserts the bus relinquish signal to communicate that the second controller is in control of the bus before accessing the memory;
when requiring access to the memory, the first controller transmits an access request to the second controller via the communication lines by deasserting the acknowledge signal to regain control of the bus, and in response thereto the second controller relinquishes control of the bus, and transmits an acknowledge to the first controller by asserting the bus relinquish signal, whereupon the first controller takes control of the bus.

30. The control system of claim 27, wherein:
the communication lines between the first and second controllers include at least a request line and an acknowledge line;
when requiring access to the memory, the second controller sends an access request to the first controller by asserting the request line to request control of the bus, and the first controller selectively grants the access request and thereupon relinquishes control of the bus and asserts the acknowledge line; and
when requiring access to the memory, the first controller transmits an access request to the second controller via the communication lines by deasserting the acknowledge signal to regain control of the bus, and in response thereto the second controller relinquishes control of the bus and transmits an acknowledge to the first controller by deasserting the request line.

31. A storage device comprising:
(a) a storage medium;
(b) a buffer memory;
(c) a bus connected to the memory;
(d) a storage controller connected to the bus for transferring data between the medium and the buffer memory,
(e) a host interface connected to the bus for transferring data between a host and the buffer memory;
(f) communication lines connecting the storage controller and the host interface for communication and handshaking therebetween for controlling the accessing of the memory;
the host interface including a control logic circuit configured for: transmitting an access request to the storage controller via the communication lines for control of the bus to access the memory, and upon detecting an acknowledge from the storage controller in response thereto, providing a memory address and accessing the memory;

the storage controller including a control logic circuit configured for: selectively granting the access request from the host interface, and transmitting an acknowledge to the host interface via the communication lines.

32. The storage device of claim 31, wherein:

the storage controller has a first priority for accessing the memory, and the host interface has a second priority for accessing the memory, said second priority being lower than said first priority; and the control logic circuit of the storage controller is further configured for granting the access request only after completing access to the memory.

33. The storage device of claim 31, wherein:

the storage controller has a first priority for accessing the memory, and the host interface has a second priority for accessing the memory, said second priority being lower than said first priority;

the storage controller maintains control of the bus for accessing the memory, and upon detecting an access request from the host interface, the storage controller selectively grant access to the host interface; and the host interface returns control of the bus back to the storage controller upon detecting an access request from the storage controller.

34. The storage device of claim 31, wherein:

the control logic circuit of the storage controller is further configured for relinquishing control of the bus upon granting said access request, and then transmitting said acknowledge to the host interface via the communication lines.

35. The storage device of claim 34, wherein the storage controller places the bus in tristate to relinquish control of the bus upon granting said access request.

36. The storage device of claim 34, wherein in response to the access request from the host interface, the control logic circuit of the storage controller detects presence of a condition, and if said condition is present, then grants access to the host interface.

37. The storage device claim 31, wherein:

the control logic circuit of the storage controller is further configured such that, upon granting the access request from the host interface, the storage controller relinquishes control of the bus, and then transmits said acknowledge to the host interface via the communication lines.

38. The storage device of claim 37, wherein the storage controller relinquish control of the bus by placing the bus in tristate.

39. The storage device of claim 31 wherein the control logic circuit of the host interface is further configured to relinquish control of the bus after completing access to the memory.

40. The storage device of claim 39, wherein the control logic circuit of the host interface places the bus in tristate to relinquish control of the bus.

41. The storage device of claim 39, wherein:

the communication lines between the storage controller and the host interface include a request line and an acknowledge line;

the control logic circuit of the host interface sends an access request to the storage controller by asserting the request line to request control of the bus, and deasserts the request line after relinquishing control of the bus; and the control logic circuit of the storage controller transmits an acknowledge to the host interface by asserting the acknowledge line to transfer control of the bus to the host interface.

42. The storage device of claim 31, wherein:

the control logic circuit of the storage controller is further configured for transmitting an access request to the host interface via the communication lines for control of the bus to access the memory, and upon receiving an acknowledge from the host interface, providing a memory address and accessing the memory; and the control logic circuit of the host interface is further configured for granting the access request of the storage controller and upon granting said access request: (1) relinquishing control of the bus and (2) transmitting an acknowledge to the storage controller via the communication lines.

43. The storage device of claim 42, wherein the host interface relinquishes control of the bus by placing the bus in tristate.

44. The storage device of claim 42, wherein:

the communication lines between the storage controller and the host interface include at least a request line, an acknowledge line and a bus relinquish line;

when requiring access to the memory, the host interface sends an access request to the storage controller by asserting the request line to request control of the bus, and the storage controller selectively grants the access request and thereupon relinquishes control of the bus, asserts the bus relinquish line and asserts the acknowledge line, whereby the host interface deasserts the bus relinquish signal to communicate that the host interface is in control of the bus before accessing the memory;

when requiring access to the memory, the storage controller transmits an access request to the host interface controller via the communication lines by deasserting the acknowledge signal to regain control of the bus, and in response the host interface relinquishes control of the bus, and transmits an acknowledge to the storage controller by asserting the bus relinquish signal, whereupon the storage controller takes control of the bus.

45. The storage device of claim 42, wherein:

the communication lines between the storage controller and the host interface include at least a request line and an acknowledge line;

when requiring access to the memory, the host interface sends an access request to the storage controller by asserting the request line to request control of the bus, and the storage controller selectively grants the access request and thereupon relinquishes control of the bus and asserts the acknowledge line;

when requiring access to the memory, the storage controller transmits an access request to the host interface via the communication lines by deasserting the acknowledge signal to regain control of the bus, and in response the host interface relinquishes control of the bus and transmits an acknowledge to the storage controller by deasserting the request line.

46. A control system for controlling access to a shared memory, the control system comprising:

a bus connected to the memory;

two controllers, each controller connected to the bus to control data transfer between that controller and the memory via the bus;

communication lines connecting the controllers for communication and handshaking between the controllers for controlling the accessing of the memory;

each controller including a control logic circuit configured for:
- (a) when requiring access to the memory, transmitting an access request via the communication lines to another controller in control of the bus, for obtaining control of the bus to access the memory, and upon detecting grant of that access request, assuming control of the bus, providing a memory address, and accessing the memory via the bus; and
- (b) when in control of the bus, selectively granting an access request to relinquish control of the bus to a requesting controller, and communicating grant of an access request to the requesting controller via the communication lines.

47. The control system of claim 46, wherein the control logic circuit of each controller is further configured such that selectively granting an access request of a requesting controller further includes relinquishing control of the bus to the requesting controller.

48. The control system of claim 47, wherein the control logic circuit of at least one controller is further configured for detecting presence of at least one condition in response to an access request, and if said at least one condition is present, then granting that access request.

49. The control system of claim 48, wherein each controller relinquishes control of the bus by placing the bus in tristate.

50. The control system of claim 49, wherein another one of the controllers has a priority higher than the other controllers for accessing the memory, and the control logic circuit of the higher priority controller is further configured for granting an access request only after completing memory access.

51. The control system of clam 46, wherein the control logic circuit of at least one controller is further configured for relinquishing control of the bus upon completing memory access.

52. The control system of claim 46 wherein the control logic circuit of at least one controller is further configured for granting the access request of a requesting controller only after said at least one controller completes accessing the memory.

53. The control system of claim 46, wherein the control logic circuit of at least one controller is further configured for unconditionally granting an access request of a requesting controller and relinquishing control of the bus.

54. The control system of claim 53, wherein said at least one controller unconditionally grants an access request after completing an ongoing memory access.

55. The control system of claim 47, wherein the control logic circuit of each controller is further configured such that selectively granting an access request of a requesting controller further includes relinquishing control of the bus and transmitting a bus relinquish signal to the requesting controller via the communication lines to communicate relinquishment of control of the bus.

56. The control system of claim 55, wherein the control logic circuit of each controller is further configured such that relinquishing control of the bus includes placing the bus in tristate.

57. The control system of claim 46, wherein:
the communication lines between the controllers include at least a request line and an acknowledge line;
the control logic circuit of at least a first controller is further configured for:
- (a) when in control of the bus, upon detecting the request line asserted, selectively granting an access request of a requesting controller and transmitting an acknowledge by asserting the acknowledge line to transfer control of the bus to the requesting controller; and
- (b) when requiring access to the memory, sending an access request to a controller in control of the bus by deasserting the acknowledge line to regain control of the bus; and the control logic circuit of at least a second controller is further configured for:
- (c) when requiring access to the memory, sending an access request to a controller in control of the bus by asserting the request line to another controller to request control of the bus for access to the memory, and upon detecting the acknowledge line asserted, accessing the memory; and
- (d) when in control of the bus, upon detecting the acknowledge line deasserted by a requesting controller, selectively granting an access request and relinquishing control of the bus.

58. The control system of claim 57, wherein the control logic circuit of the second controller is further configured for relinquishing control of the bus and deasserting the request line upon finishing access to the memory or detecting an access request.

59. The control system of claim 57, wherein the second controller communicates grant of an access request of the first controller by deasserting the request line.

60. The control system of claim 57, wherein:
the communication lines further include a bus relinquish signal; and
the control logic circuit of each controller is further configured for deasserting the bus relinquish signal when taking control of the bus, and asserting the bus relinquish signal when relinquishing control of the bus;
such that a requesting controller takes control of the bus upon assertion of the bus relinquish signal by a controller in control of the bus, and the requesting controller deasserts the bus relinquish signal to prevent contention for the bus.

61. A method of providing access to a shared memory interconnected to at least a first controller and a second controller via a bus, the bus for transferring data between the first controller and the memory, and between the second controller and the memory, the first and second controllers having communication lines therebetween for communication and handshaking between the first and second controllers for accessing the memory via the bus, the communication lines including at least a request line, an acknowledge line and a bus relinquish line, the method comprising the steps of:
- (a) the second controller asserting the request line to transmit an access request to the first controller for control of the bus to access the memory;
- (b) the first controller selectively granting the access request;
- (c) upon granting the access request, the first controller asserting the acknowledge line and asserting the bus relinquish line to transfer control of the bus to the second controller;
- (d) upon detecting the acknowledge, the second controller deasserting the bus relinquish line to communicate that the second controller is in control of the bus before accessing the memory;

(e) the first controller deasserting the acknowledge line to transmit an access request to the second controller to regain control of the bus to access the memory;

(f) the second controller granting the access request from the first controller;

(g) upon granting the access request from the first controller, the second controller: (1) relinquishing control of the bus and (2) transmitting an acknowledge to the first controller via the communication lines, wherein the second controller asserts the bus relinquish line to communicate that the second controller has relinquished control of the bus, whereupon the first controller takes control of the bus; and (h) upon receiving the acknowledge from the second controller, the first controller accessing the memory.

62. The method of claim 61, wherein step (b) of the first controller selectively granting the access request includes the second controller relinquishing control of the bus.

63. A control system for controlling access to a shared memory, the control system comprising:

a bus connected to the memory;

a first controller connected to the bus for accessing the memory to transfer data between the first controller and the memory via the bus;

a second controller connected to the bus for accessing the memory to transfer data between the second controller and the memory via the bus;

communication lines connecting the first and second controllers for communication and handshaking between the first and the second controllers for controlling the accessing of the memory, the communication lines including at least a request line, an acknowledge line and a bus relinquish line;

wherein the second controller includes a control logic circuit configured for: transmitting an access request to the first controller via the communication lines for control of the bus to access the memory, and accessing the memory upon detecting an acknowledge from the first controller in response to the access request;

wherein the first controller includes a control logic circuit configured for: selectively granting the access request from the second controller, and transmitting the acknowledge to the second controller via the communication lines controller in response to the access request;

wherein the control logic circuit of the first controller is further configured for transmitting an access request to the second controller via the communication lines for control of the bus to access the memory, and accessing the memory upon receiving an acknowledge from the second controller; and wherein the control logic circuit of the second controller is further configured for granting the access request of the first controller and upon granting that access request: (1) relinquishing control of the bus and (2) transmitting an acknowledge to the first controller via the communication lines;

such that:

(i) when requiring access to the memory, the second controller sends an access request to the first controller by asserting the request line to request control of the bus, and the first controller selectively grants the access request and thereupon relinquishes control of the bus, asserts the bus relinquish line and asserts the acknowledge line, whereby the second controller deasserts the bus relinquish signal to communicate that the second controller is in control of the bus before accessing the memory; and (ii) when requiring access to the memory, the first controller transmits an access request to the second controller via the communication lines by deasserting the acknowledge signal to regain control of the bus, and in response thereto the second controller relinquishes control of the bus, and transmits an acknowledge to the first controller by asserting the bus relinquish signal, whereupon the first controller takes control of the bus.

64. A storage device comprising:

(a) a storage medium;

(b) a buffer memory;

(c) a bus connected to the memory;

(d) a storage controller connected to the bus for transferring data between the medium and the buffer memory, (e) a host interface connected to the bus for transferring data between a host and the buffer memory;

(f) communication lines connecting the storage controller and the host interface for communication and handshaking therebetween for controlling the accessing of the memory, the communication lines including at least a request line, an acknowledge line and a bus relinquish line;

the host interface including a control logic circuit configured for: transmitting an access request to the storage controller via the communication lines for control of the bus to access the memory, and accessing the memory upon detecting an acknowledge from the storage controller in response;

the storage controller including a control logic circuit configured for: selectively granting the access request from the host interface, transmitting an acknowledge to the host interface via the communication lines;

wherein the control logic circuit of the storage controller is further configured for transmitting an access request to the host interface via the communication lines for control of the bus to access the memory, and accessing the memory upon receiving an acknowledge from the host interface; and wherein the control logic circuit of the host interface is further configured for granting the access request of the storage controller and upon granting said access request: (1) relinquishing control of the bus and (2) transmitting an acknowledge to the storage controller via the communication lines such that:

(i) when requiring access to the memory, the host interface sends an access request to the storage controller by asserting the request line to request control of the bus, and the storage controller selectively grants the access request and thereupon relinquishes control of the bus, asserts the bus relinquish line and asserts the acknowledge line, whereby the host interface deasserts the bus relinquish signal to communicate that the host interface is in control of the bus before accessing the memory; and (ii) when requiring access to the memory, the storage controller transmits an access request to the host interface controller via the communication lines by deasserting the acknowledge signal to regain control of the bus, and in response the host interface relinquishes control of the bus, and transmits an acknowledge to the storage controller by asserting the bus relinquish signal, whereupon the storage controller takes control of the bus.

65. A control system for controlling access to a shared memory, the control system comprising:

a bus connected to the memory;

two controllers, each controller connected to the bus to control data transfer between that controller and the memory via the bus;

communication lines connecting the controllers for communication and handshaking between the controllers for controlling the accessing of the memory;

each controller including a control logic circuit configured for:
  (a) when requiring access to the memory, transmitting an access request via the communication lines to another controller in control of the bus, for obtaining control of the bus to access the memory, and upon detecting grant of the access request, assuming control of the bus and accessing the memory via the bus; and
  (b) when in control of the bus, selectively granting an access request to relinquish control of the bus to a requesting controller, relinquishing control of the bus, transmitting a bus relinquish signal to the requesting controller via the communication lines to communicate relinquishment of control of the bus, and communicating grant of the access request to the requesting controller via the communication lines.

66. The control system of claim 65, wherein the control logic circuit of each controller is further configured such that relinquishing control of the bus includes placing the bus in tristate.

67. A control system for controlling access to a shared memory, the control system comprising:

a bus connected to the memory;

two or more controllers, each controller connected to the bus to control data transfer between that controller and the memory via the bus;

communication lines connecting the controllers for communication and handshaking between the controllers for controlling the accessing of the memory, the communication lines including a request signal line, an acknowledge signal line and a bus relinquish signal line;

each controller including a control logic circuit configured for:
  (a) when requiring access to the memory, transmitting an access request via the communication lines to another controller in control of the bus, for obtaining control of the bus to access the memory, and upon detecting grant of the access request, assuming control of the bus and accessing the memory via the bus; and
  (b) when in control of the bus, selectively granting an access request to relinquish control of the bus to a requesting controller, and communicating grant of the access request to the requesting controller via the communication lines;

wherein the control logic circuit of one of the controllers is further configured for:
  (i) when in control of the bus, upon detecting the request line asserted, selectively granting an access request of a requesting controller and transmitting an acknowledge by asserting the acknowledge line to transfer control of the bus to the requesting controller; and
  (ii) when requiring access to the memory, sending an access request to a controller in control of the bus by deasserting the acknowledge signal to regain control of the bus; and wherein the control logic circuit of another of the controllers is further configured for:
  (i) when requiring access to the memory, sending an access request to a controller in control of the bus by asserting the request line to the another controller to request control of the bus for access to the memory, and upon detecting the acknowledge line asserted, accessing the memory; and
  (ii) when in control of the bus, upon detecting the acknowledge line deasserted by a requesting controller, selectively granting an access request and relinquishing control of the bus.

such that each controller deasserts the bus relinquish signal when taking control of the bus, and asserts the bus relinquish signal when relinquishing control of the bus, whereby a requesting controller takes control of the bus upon assertion of the bus relinquish signal by a controller in control of the bus, and the requesting controller deasserts the bus relinquish signal to prevent contention for the bus.

68. The method of claim 1, wherein in step (c) upon granting the access request, the first controller transmits an acknowledge to the second controller via the communication lines and relinquishes control of the bus to the second controller.

* * * * *